(12) United States Patent
Abe

(10) Patent No.: US 8,629,995 B2
(45) Date of Patent: Jan. 14, 2014

(54) PERIPHERAL APPARATUS CONTROL

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 13/204,607

(22) Filed: Aug. 5, 2011

(65) Prior Publication Data

US 2012/0050798 A1 Mar. 1, 2012

(30) Foreign Application Priority Data

Aug. 26, 2010 (JP) ................................ 2010-189988

(51) Int. Cl.
*G06F 3/12* (2006.01)

(52) U.S. Cl.
USPC ........ 358/1.13; 358/1.14; 358/1.15; 715/273; 709/206

(58) Field of Classification Search
USPC .................. 358/1.13–1.16; 709/206; 715/273
See application file for complete search history.

(56) References Cited

U.S. PATENT DOCUMENTS

| | | | |
|---|---|---|---|
| 6,622,266 B1 * | 9/2003 | Goddard et al. | 714/44 |
| 6,666,594 B2 * | 12/2003 | Parry | 400/74 |
| 6,892,299 B2 | 5/2005 | Abe | |
| 7,019,857 B2 | 3/2006 | Abe | |
| 7,084,999 B2 | 8/2006 | Abe | |
| 7,209,965 B2 * | 4/2007 | Sato | 709/224 |
| 7,464,333 B2 * | 12/2008 | Yamamoto | 715/273 |
| 2001/0003827 A1 * | 6/2001 | Shimamura | 709/206 |
| 2006/0044572 A1 * | 3/2006 | Nakayama | 358/1.1 |
| 2007/0005845 A1 | 1/2007 | Abe | |
| 2008/0231900 A1 | 9/2008 | Abe | |

FOREIGN PATENT DOCUMENTS

JP 2009003778 A 1/2009

OTHER PUBLICATIONS http://msdn.microsoft.com/en-us/library/ms123401(d=printer) Microsoft Developer Network.
http://www.microsoft.com/en-us/windows/hardware/gg463146.aspx, "Implementing Web Services on Devices for Printing and Scanning", updated Jan. 29, 2007.
http://www.microsoft.com/en-us/windows/hardware/gg46118.aspx, "Web Services on Devices".
U.S. Appl. No. 13/163,101, filed Jun. 17, 2011, Koichi Abe, et al.

* cited by examiner

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

An information processing apparatus, which is connected to a peripheral apparatus via a network, issues, to the peripheral apparatus, a request required to acquire a response including information that represents whether or not the peripheral apparatus can notify the information processing apparatus of an event upon completion of print processing. Then, when the information included in the response returned from the peripheral apparatus in response to the request represents that the peripheral apparatus cannot notify the information processing apparatus of any event, the information processing apparatus deletes a print job, data of which have been sent to the peripheral apparatus, from a printer queue required to stack print jobs.

17 Claims, 27 Drawing Sheets

↔ REPRESENTS ADDRESS/DATA BUS

FIG. 5

| User | Spooler | LM | PM(WSDMon) | WSD Printer |
|---|---|---|---|---|

```
PRINT START  //S501
         StartPrintJob(){  //S502
            do{
               spRet=LM_StartDocPort();  //S503
                        LM_StartDocPort(){  //S504
                           lmRet=PM_StartDocPort();  //S505
                                       PM_StartDocPort(){  //S506
                                          //EXECUTE APPROPRIATE PROCESSING
                                          AS NEEDED  S507
                                          pmRet=・・・;
                                          return pmRet;  //S508
                                       }
                           return lmRet;  //S509
                        }
            }
            while(!spRet);  //S510
            do{
               spRet=LM_WritePort();  //S511
                        LM_WritePort(){  //S512
                           lmRet=PM_WritePort();  //S513
                                       PM_WritePort(){  //S514
                                          pmRet=CreatePrintJob();  //S515
                                                      CreatePrintJobResponse/Fault  //S516
                                          return pmRet;  //S517
                                       }
                           return lmRet;  //S518
                        }
            }
            while(!spRet);  //S519
            ・・・PRINT DATA SENDING PROCESSING (FIG. 7)・・・
            spRet=LM_EndDocPort();  //S520
                        LM_EndDocPort(){  //S521
                           lmRet=PM_EndDocPort();  //S522
                                       PM_EndDocPort(){  //S523
                                          LAUNCH JobEndStateEvent NOTIFICATION
                                          WAITING PROCESS  //S524
                                          //EXECUTE APPROPRIATE PROCESSING
                                          AS NEEDED  S525
                                          PmRet=・・・;
                                          return pmRet;  //S526
                                       }
                           return lmRet;  //S527
                        }
            return spRet;  //S528
         }
```

FIG. 6

| User | Spooler | LM | PM(WSDMon) | WSD Printer |
|---|---|---|---|---|

PRINT START //S601
　　StartPrintJob(){ //S602
　　　do{
　　　　spRet=LM_StartDocPort(); //S603
　　　　　LM_StartDocPort(){ //S604
　　　　　　lmDeleteJob=FALSE; //S605
　　　　　　lmJobId=0; //S606
　　　　　　　・・・SAME PROCESSES AS IN S505 TO S509 IN FIG. 5・・・
　　　　}
　　　while(!spRet); //S607
　　　・・・PRINT PROCESSING (FIG. 11)・・・
　　　spRet=LM_EndDocPort(); //S608
　　　　　LM_EndDocPort(){ //S609
　　　　　　do{
　　　　　　　lmRet=GetPrinterElements(wprt:PrinterDescription); //S610
　　　　　　　　　　　　　　　　　　　　　　　GetPrinterElementsResponse //S611
　　　　　　}
　　　　　　while(!INFO:000); //S612
　　　　　　・・・SAME PROCESSES AS IN S522 TO S526 IN FIG. 5・・・
　　　　　　if(lmDeleteJob==TRUE){ //S613
　　　　　　　PRINT JOB DELETE PROCESSING
　　　　　　　(S1304, S1306 IN FIG. 13); //S614
　　　　　　}
　　　　　　lmDeleteJob=FALSE; //S615
　　　　　　lmJobId=0; //S616
　　　　　　return lmRet; //S617
　　　　　}
　　　return spRet; //S618
　　}

FIG. 7

```
 User        Spooler        LM           PM(WSDMon)   WSD Printer

PRINT START //S501 IN FIG. 5, S601 IN FIG. 6
             StartPrintJob(){ //S502 IN FIG. 5, S602 IN FIG. 6
               ···OMITTED···
               while(!spRet);  //S519 IN FIG. 5, S1118 IN FIG. 11
                 do{
                     spRet=LM_WritePort();  //S701
                                 LM_WritePort(){ //S702
                                    lmRet=PM_WritePort();  //S703
                                                  PM_WritePort(){ //S704
                                                     pmRet=SendDocument();  //S705
                                                                   SendDocumentResponse //S706
                                                     return lmRet;  //S707
                                                  }
                                    return lmRet;  //S708
                                 }
                 }
               while(!spRet);  //S709
               spRet=LM_EndDocPort();  //S520 IN FIG. 5, S608 IN FIG. 6
                ···OMITTED···
             }
```

FIG. 8A

```
<soap:Envelope xmlns:soap="http://www.w3.org/2003/05/soap-envelope"
 xmlns:wsa="http://schemas.xmlsoap.org/ws/2004/08/addressing"
 xmlns:wprt="http://schemas.yyyy.xxx/YYYY/MM/wdp/print">
 <soap:Header>
  <wsa:Action>http://schemas.yyyy.xxx/YYYY/MM/wdp/print/GetPrinterElements</wsa:Action>
  <wsa:MessageID>%MESSAGE_ID%</wsa:MessageID>
  <wsa:ReplyTo>%REPLY_TO%</wsa:ReplyTo>
  <wsa:From>%FROM%</wsa:From>
 </soap:Header>
 <soap:Body>
  <wprt:GetPrinterElementsRequest>
   <wprt:RequestedElements>
    <wprt:Name>wprt:PrinterDescription</wprt:Name>   ~ 801
   </wprt:RequestedElements>
  </wprt:GetPrinterElementsRequest>
 </soap:Body>
</soap:Envelope>
```

FIG. 8B

```
<soap:Envelope xmlns:soap="http://www.w3.org/2003/05/soap-envelope"
 xmlns:wsa="http://schemas.xmlsoap.org/ws/2004/08/addressing"
 xmlns:wprt="http://schemas.yyy.xxx/YYY/MM/wdp/print">
 xmlns:ans="http://www.abc.xxx/ns/wdp/print/v100">  ~~806
 <soap:Header>
  <wsa:Action>http://schemas.yyyy.xxx/YYYY/MM/wdp/print/GetPrinterElementsResponse</wsa:Action>
  <wsa:MessageID>%MESSAGE_ID%</wsa:MessageID>
  <wsa:RelatesTo>%RELATES_TO%</wsa:RelatesTo>
  <wsa:To>%TO%</wsa:To>
 </soap:Header>
 <soap:Body>
  <wprt:GetPrinterElementsResponse>
   <wprt:PrinterElements>
    <wprt:ElementData Name='wprt:PrinterDescription' Valid='true'>  ~~803
     <wprt:PrinterDescription>  ~~805
      <wprt:DeviceId>  ~~804
       MFG:ABC;CMD:ABCCommand;MDL:Kmmn;CLS:PRINTER;DES:ABC Kmmn;VER:1.00;INFO:001;
      </wprt:DeviceId>
      <ans:EventControl>false</ans:EventControl>  ~~802
      <ans:MultipleJobsControl>false</ans:MultipleJobsControl>  ~~807
     </wprt:PrinterDescription>
    </wprt:ElementData>
   </wprt:PrinterElements>
  </wprt:GetPrinterElementsResponse>
 </soap:Body>
</soap:Envelope>
```

FIG. 10A

| No. | Computer Name | Subscribed Event | ans:EventControl |
|---|---|---|---|
| 1 | PC1 | PrinterElementsChangeEvent<br>PrinterStatusSummaryEvent<br>PrinterStatusConditionEvent<br>PrinterStatusConditionClearedEvent<br>JobStatusEvent<br>JobEndStateEvent | true |
| 2 | PC2 | PrinterElementsChangeEvent<br>PrinterStatusSummaryEvent<br>PrinterStatusConditionEvent<br>PrinterStatusConditionClearedEvent<br>JobStatusEvent<br>JobEndStateEvent | true |

FIG. 10B

| No. | Computer Name | wprt: JobName | wprt: JobOriginatingUserName | wprt: JobId | ans:EventControl | Status |
|---|---|---|---|---|---|---|
| 1 | PC5 | Photo2 | Natsu | 1001 | false | Processing |
| 2 | PC1 | Test Print | Mami | 1002 | true | Not Accepted |
| 3 | PC2 | Doc8 | Misa | 1003 | true | Not Accepted |
| 4 | Null | Null | Null | Null | Null | Null |
| 5 | Null | Null | Null | Null | Null | Null |

FIG. 10C

| No. | Computer Name | wprt: JobName | wprt: JobOriginatingUserName | wprt: JobId | ans:EventControl | Status |
|---|---|---|---|---|---|---|
| 1 | PC1 | Test Print | Mami | 1002 | true | Processing |
| 2 | PC2 | Doc8 | Misa | 1003 | true | Not Accepted |
| 3 | Null | Null | Null | Null | Null | Null |
| 4 | Null | Null | Null | Null | Null | Null |
| 5 | Null | Null | Null | Null | Null | Null |

F I G. 10D

| No. | Computer Name | Subscribed Event | ans:EventControl2 |
|---|---|---|---|
| 1 | PC1 | PrinterElementsChangeEvent | false |
| | | PrinterStatusSummaryEvent | false |
| | | PrinterStatusConditionEvent | false |
| | | PrinterStatusConditionClearedEvent | false |
| | | JobStatusEvent | true |
| | | JobEndStateEvent | true |
| 2 | PC2 | PrinterElementsChangeEvent | false |
| | | PrinterStatusSummaryEvent | false |
| | | PrinterStatusConditionEvent | false |
| | | PrinterStatusConditionClearedEvent | false |
| | | JobStatusEvent | true |
| | | JobEndStateEvent | true |
| 3 | PC5 | PrinterElementsChangeEvent | false |
| | | PrinterStatusSummaryEvent | false |
| | | PrinterStatusConditionEvent | false |
| | | PrinterStatusConditionClearedEvent | false |
| | | JobStatusEvent | true |
| | | JobEndStateEvent | true |

| User | Spooler | LM | PM(WSDMon) | WSD Printer |
|------|---------|-----|------------|-------------|

```
···S601 TO S607 IN FIG. 6···
        do{  //S1101
            spRet=LM_WritePort();  //S1102
                LM_WritePort(){  //S1103
                    lmRet=PM_WritePort();  //S1104
                        PM_WritePort(){  //S1105
                            pmRet=CreatePrintJob();  //S1106
                                            CreatePrintJobResponse/Fault  //S1107
                            return pmRet;  //S1108
                        }
                    if(lmRet){  //S1109
                        lmRet=GetPrinterElements(wprt:PrinterDescription);  //S1110
                                            GetPrinterElementsResponse  //S1111
                        if(<ans:EventControl>=="false"){  //S1112
                            lmDeleteJob=TRUE;  //S1113
                        }
                        lmRet=GetActiveJobs();  //S1114
                                            GetActiveJobsResponse  //S1115
                        lmJobId=wprt:JobId;  //S1116
                    }
                    return lmRet;  //S1117
                }
        }
        while(!spRet);  //S1118
            ···PRINT DATA SENDING PROCESSING (FIG. 7)···
···S609 TO S618 IN FIG. 6···
```

F I G. 14A

```
<soap:Envelope xmlns:soap="http://www.w3.org/2003/05/soap-envelope"
 xmlns:wsa="http://schemas.xmlsoap.org/ws/2004/08/addressing"
 xmlns:wprt="http://schemas.yyyy.xxx/YYYY/MM/wdp/print">
 <soap:Header>
  <wsa:Action>http://schemas.yyyy.xxx/YYYY/MM/wdp/print/GetActiveJobs</wsa:Action>
  <wsa:MessageID>%MESSAGE_ID%</wsa:MessageID>
  <wsa:ReplyTo>%REPLY_TO%</wsa:ReplyTo>
  <wsa:From>%FROM%</wsa:From>
 </soap:Header>
 <soap:Body>
  <wprt:GetActiveJobsRequest>
 </soap:Body>
</soap:Envelope>
```

F I G. 14B

```xml
<soap:Envelope xmlns:soap="http://www.w3.org/2003/05/soap-envelope"
 xmlns:wsa="http://schemas.xmlsoap.org/ws/2004/08/addressing"
 xmlns:wprt="http://schemas.yyyy.xxx/YYYY/MM/wdp/print">
<soap:Header>
<wsa:Action>http://schemas.yyyy.xxx/YYYY/MM/wdp/print/GetActiveJobsResponse</wsa:Action>
<wsa:MessageID>%MESSAGE_ID%</wsa:MessageID>
<wsa:RelatesTo>%RELATES_TO%</wsa:RelatesTo>
<wsa:To>%TO%</wsa:To>
</soap:Header>
<soap:Body>
<wprt:GetActiveJobsResponse>
<wprt:ActiveJobs>           ~1403
<wprt:JobSummary>    ~1401
<wprt:JobId>1001</wprt:JobId>          ~1402
<wprt:JobState>Processing</wprt:JobState>   ~1404
<wprt:JobName>Photo2</wprt:JobName>          ~1405
<wprt:JobOriginatingUserName>Natsu</wprt:JobOriginatingUserName>   ~1406
<wprt:KOctetsProcessed>512</wprt:KOctetsProcessed>
<wprt:MediaSheetsCompleted>0</wprt:MediaSheetsCompleted>
<wprt:NumberOfDocuments>1</wprt:NumberOfDocuments>
</wprt:JobSummary>
</wprt:ActiveJobs>
</wprt:GetActiveJobsResponse>
</soap:Body>
</soap:Envelope>
```

FIG. 17A

```xml
<soap:Envelope xmlns:soap="http://www.w3.org/2003/05/soap-envelope"
  xmlns:wsa="http://schemas.xmlsoap.org/ws/2004/08/addressing"
  xmlns:wprt="http://schemas.yyyy.xxx/YYYY/MM/wdp/print">
<soap:Header>
<wsa:Action>http://schemas.yyyy.xxx/YYYY/MM/wdp/print/GetPrinterElements</wsa:Action>
<wsa:MessageID>%MESSAGE_ID%</wsa:MessageID>
<wsa:ReplyTo>%REPLY_TO%</wsa:ReplyTo>
<wsa:From>%FROM%</wsa:From>
</soap:Header>
<soap:Body>
<wprt:GetPrinterElementsRequest>
  <wprt:RequestedElements>
    <wprt:Name>wprt:PrinterDescription</wprt:Name>~801
  </wprt:RequestedElements>
</wprt:GetPrinterElementsRequest>
</soap:Body>
</soap:Envelope>
```

FIG. 17B

```
<soap:Envelope xmlns:soap="http://www.w3.org/2003/05/soap-envelope"
 xmlns:wsa="http://schemas.xmlsoap.org/ws/2004/08/addressing"
 xmlns:wprt="http://schemas.yyyy.xxx/YYYY/MM/wdp/print"
 xmlns:ans="http://www.abc.xxx/ns/wdp/print/v100">  ~~~ 806
 <soap:Header>
  <wsa:Action>http://schemas.yyyy.xxx/YYYY/MM/wdp/print/GetPrinterElementsResponse</wsa:Action>
  <wsa:MessageID>%MESSAGE_ID%</wsa:MessageID>
  <wsa:RelatesTo>%RELATES_TO%</wsa:RelatesTo>
  <wsa:To>%TO%</wsa:To>
 </soap:Header>
 <soap:Body>
  <wprt:GetPrinterElementsResponse>
   <wprt:PrinterElements>
    <wprt:ElementData Name='wprt:PrinterDescription' Valid='true'>  ~~~ 803
     <wprt:PrinterDescription>  ~~~ 805
      <wprt:DeviceId>  ~~~ 804
       MFG:ABC;CMD:ABCCommand;MDL:Kmmn;CLS:PRINTER;DES:ABC Kmmn;VER:1.00;INFO:001;
      </wprt:DeviceId>
      <ans:EventControl2>  ~~~ 1701
       <ans:PrinterElementsChangeEvent>false</ans:PrinterElementsChangeEvent>  ~~~ 1702
       <ans:PrinterStatusSummaryEvent>false</ans:PrinterStatusSummaryEvent>  ~~~ 1703
       <ans:PrinterStatusConditionEvent>false</ans:PrinterStatusConditionEvent>  ~~~ 1704
       <ans:PrinterStatusConditionClearedEvent>false</ans:PrinterStatusConditionClearedEvent>  ~~~ 1705
       <ans:JobStatusEvent>true</ans:JobStatusEvent>  ~~~ 1706
       <ans:JobEndStateEvent>true</ans:JobEndStateEvent>  ~~~ 1707
      </ans:EventControl2>
     </wprt:PrinterDescription>
    </wprt:ElementData>
   </wprt:PrinterElements>
  </wprt:GetPrinterElementsResponse>
 </soap:Body>
</soap:Envelope>
```

FIG. 18A

| Document Name | Status | Owner | Pages | Size | Port |
|---|---|---|---|---|---|
| ☐ Test Print | Printing | Mami | 1 | 100KB | WSD-alc7d... |

ABC Kmmn(PC1)
Printer  Document  View

ABC Kmmn(PC1)
Printer  Document  View

| Document Name | Status | Owner | Pages | Size | Port |
|---|---|---|---|---|---|

ABC Kmmn(PC5)
Printer  Document  View

| Document Name | Status | Owner | Pages | Size | Port |
|---|---|---|---|---|---|
| ☐ Photo2 | Printing | Natsu | 1 | 512KB | WSD-cfe8d... |

ABC Kmmn(PC5)
Printer  Document  View

| Document Name | Status | Owner | Pages | Size | Port |
|---|---|---|---|---|---|
| ☐ Photo2 | Sent to Printer | Natsu | 1 | 512KB | WSD-cfe8d... |

ABC Kmmn(PC5)
Printer  Document  View

| Document Name | Status | Owner | Pages | Size | Port |
|---|---|---|---|---|---|

F I G. 19A

```
<soap:Envelope xmlns:soap="http://www.w3.org/2003/05/soap-envelope"
 xmlns:wsa="http://schemas.xmlsoap.org/ws/2004/08/addressing"
 xmlns:wprt="http://schemas.yyyy.xxx/YYYY/MM/wdp/print"> ~1905
  <soap:Header>
    <wsa:To>%TO%</wsa:To>
    <wsa:Action>http://schemas.yyyy.xxx/YYYY/MM/wdp/print/CreatePrintJob</wsa:Action>
    <wsa:MessageID>%MESSAGE_ID%</wsa:MessageID>
    <wsa:ReplyTo>%REPLY_TO%</wsa:ReplyTo>
    <wsa:From>%FROM%</wsa:From>
  </soap:Header>
  <soap:Body>
    <wprt:CreatePrintJobRequest>
      <wprt:PrintTicket> ~1901
        <wprt:JobDescription>
          <wprt:JobName>Photo2</wprt:JobName> ~1902
          <wprt:JobOriginatingUserName>Natsu</wprt:JobOriginatingUserName> ~1903
        </wprt:JobDescription>
      </wprt:PrintTicket>
    </wprt:CreatePrintJobRequest>
  </soap:Body>
</soap:Envelope>
```

FIG. 19B

```
<soap:Envelope xmlns:soap="http://www.w3.org/2003/05/soap-envelope"
 xmlns:wsa="http://schemas.xmlsoap.org/ws/2004/08/addressing"
 xmlns:wsdp="http://schemas.xmlsoap.org/ws/2006/02/devprof"
 xmlns:wprt="http://schemas.yyyy.xxx/YYYY/MM/wdp/print">
<soap:Header>
 <wsa:To>%TO%</wsa:To>
 <wsa:Action>http://schemas.yyyy.xxx/YYYY/MM/wdp/print/CreatePrintJobResponse</wsa:Action>
 <wsa:MessageID>%MESSAGE_ID%</wsa:MessageID>
 <wsa:RelatesTo>%RELATES_TO%</wsa:RelatesTo>
</soap:Header>
<soap:Body>
 <wprt:CreatePrintJobResponse>
  <wprt:JobId>1001</wprt:JobId>      ~1904
 </wprt:CreatePrintJobResponse>
</soap:Body>
</soap:Envelope>
```

F I G. 22

```
<soap:Envelope xmlns:soap="http://www.w3.org/2003/05/soap-envelope"
    xmlns:wsa="http://schemas.xmlsoap.org/ws/2004/08/addressing"
    xmlns:wsa="http://schemas.xmlsoap.org/ws/2004/08/eventing"
    xmlns:wprt="http://schemas.yyyy.xxx/YYYY/MM/wdp/print">
  <soap:Header>
    <wsa:To>%TO%</wsa:To>
    <wsa:Action>http://schemas.yyyy.xxx/YYYY/MM/wdp/print/JobEndStateEvent</wsa:Action>
    <wsa:MessageID>%MESSAGE_ID%</wsa:MessageID>
  </soap:Header>
  <soap:Body>
    <wprt:JobEndStateEvent>  ~2201
      <wprt:JobEndState>  ~2202
        <wprt:JobId>1002</wprt:JobId>  ~2203
        <wprt:JobCompleteState>Completed</wprt:JobCompleteState>  ~2204
        <wprt:JobCompleteStateReasons>  ~2205
          <wprt:JobCompletedStateReason>JobCompletedSuccessfully</wprt:JobCompletedStateReason>  ~2206
        </wprt:JobCompleteStateReasons>
        <wprt:JobName>Test Print</wprt:JobName>  ~2207
        <wprt:JobOriginatingUserName>Mami</wprt:JobOriginatingUserName>  ~2208
        <wprt:KOctetsProcessed>100</wprt:KOctetsProcessed>
        <wprt:MediaSheetsCompleted>1</wprt:MediaSheetsCompleted>
        <wprt:NumberOfDocuments>1</wprt:NumberOfDocuments>
      </wprt:JobEndState>
    </wprt:JobEndStateEvent>
  </soap:Body>
</soap:Envelope>
```

PERIPHERAL APPARATUS CONTROL

BACKGROUND OF THE INVENTION

1. Field of the Invention

The present invention relates to a peripheral apparatus control system, peripheral apparatus, information processing apparatus, and control method.

2. Description of the Related Art

In recent years, peripheral apparatuses are connected to information processing apparatuses using various interfaces such as Ethernet® and a wireless LAN to effectively use such peripheral information control systems in homes and offices in various modes. Examples of peripheral apparatuses include a printer, copying machine, facsimile apparatus, scanner, digital camera, digital video camera, and multi-functional equipment of them.

A printer will be exemplified as a peripheral apparatus. In recent years, the standardization in a network printing system in which a printer is shared by a plurality of information processing apparatuses has advanced. For example, a network printing system which uses a WSD (Web Service on Devices) print service has been put into practical use. Such network printing systems use event-based protocols. In such a print service, an information processing apparatus executes various kinds of control using events notified from a printer to the information processing apparatus.

For example, in the network printing system using the aforementioned print service, information processing apparatuses that share a printer on a single network can execute print processing using that printer. At this time, the printer notifies the information processing apparatus of an event indicating that print processing is complete (JobEndStateEvent) in response to a print job request issued by a given information processing apparatus.

The information processing apparatuses which are notified of this event include the information processing apparatus which issued the print job, and other information processing apparatuses which share that printer on the single network. Upon reception of the event from the printer, the information processing apparatus which issued the print job deletes the print-ended print job from a printer queue in itself.

In general, control of an event where a peripheral processing apparatus such as a printer notifies an information processing apparatus is seriously influenced by limitations of hardware resources of that peripheral apparatus. For example, it is difficult for a printer to notify all information processing apparatuses connected on a single network of, for example, a processing status of a print job by means of an event.

For this reason, in general, the printer is designed to notify a specific limited number of information processing apparatuses, which are controllable by itself, of events. For example, for a low-cost printer such as a color ink-jet printer, the number of information processing apparatuses to which that printer can send an event notification is normally limited to 10 to 20.

More specifically, when the number of information processing apparatuses to which the printer can send an event notification is limited to 10, the printer cannot notify the 11th and subsequent information processing apparatuses, which share that printer, of an event.

An OS (Operating System) incorporates measures to be taken under the assumption of the printer cannot notify an event, as described above. For example, the OS periodically acquires information associated with print jobs whose processes are in progress in the printer at intervals of once per 10 min using a GetActiveJobs operation, under the assumption of a case in which a print end event (JobEndStateEvent) is not notified.

Then, while the information that is associated with print jobs whose processes are in progress in the printer, and is acquired in response to the GetActiveJobs operation, includes information associated with a print job issued by this OS, the OS leaves the corresponding print job in a printer queue. After that, when that information does not include that of the corresponding print job, the OS deletes that print job from the printer queue.

In this measure processing, a time interval at which the OS periodically issues the GetActiveJobs operation to the printer is 10 min. However, this value may be derived in consideration of traffic on the network, processing speeds of information processing apparatuses, and the like in various use environments including network scales and hardware arrangements (specifications) of information processing apparatuses.

When this time interval is set to be, for example, 5 sec, and in a use environment where a plurality of printers are shared in a large-scale network configured by 100 or more information processing apparatuses, traffics on the network increase considerably. This is because all active information processing apparatuses periodically issue GetActiveJobs operations to printers at intervals of once per 5 sec. As a result, processing speeds of other services such as transmission/reception of e-mail messages, and access to the Internet are adversely influenced.

Focusing attention on the processing of the OS in the information processing apparatus, the OS always continuously executes processing for periodically issuing a GetActiveJobs operation to a printer at intervals of once per 5 sec. That is, in case of a low-cost information processing apparatus with a lower processing performance, continuation of issuance processing of a GetActiveJobs operation once per 5 sec adversely influences other services and processes to lower the processing speed, thus impairing the user's operability. In this way, the time interval required when the OS (information processing apparatus) issues a GetActiveJobs operation to a printer cannot be carelessly shortened.

A case will be examined below wherein in a network printing system using a WSD print service, the number of information processing apparatuses to which a printer can notify an event is limited to 10 (information processing apparatuses A to J). In such a case, when there are 11 information processing apparatuses which share that printer on a single network, all 11 information processing apparatuses, that is, the information processing apparatuses A to J, and an information processing apparatus K can execute print processes using that printer.

At this time, the printer notifies the information processing apparatuses A to J of a print end event (JobEndStateEvent) in association with print job requests issued by these information processing apparatuses. Upon reception of this event, the information processing apparatuses A to J delete the corresponding print-ended print jobs from their printer queues.

However, the printer cannot notify the information processing apparatus K of the aforementioned print end event (JobEndStateEvent) in association with a print job request issued by the information processing apparatus K. As a result, the information processing apparatus K cannot delete a print-ended print job from its printer queue, and that print job is unwantedly left in the printer queue in the information processing apparatus K.

In this case where the print end event is not notified, the OS periodically acquires information associated with print jobs whose processes are in progress in the printer at intervals of once per 10 min using a GetActiveJobs operation, thereby discriminating print-ended print jobs. As a result of discrimination, if the print processing of the corresponding print job is complete, the OS deletes that print job from the printer queue. However, 10 min maximum are required after the print processing is complete until that job is deleted from the print queue. Hence, the print job cannot be deleted from the printer queue in real time.

For example, when the information processing apparatus successively issues 100 print jobs, and print processes of all the print jobs are complete within about 5 min, the print-ended print jobs are unwantedly left in the printer queue of that information processing apparatus during maximum of 10 min. As a result, operability is very poor. Also, operation errors of the user may be induced at increased risk.

SUMMARY OF THE INVENTION

The present invention provides a system and method, which allow to delete an enqueued print job in an information processing apparatus when a peripheral apparatus cannot notify the information processing apparatus of an event upon completion of print processing.

According to one aspect of the present invention, there is provided a peripheral apparatus control system, configured by an information processing apparatus using a printer queue required to stack print jobs, and a peripheral apparatus, which are connected via a network, wherein the information processing apparatus comprises: an issuance unit that issues, to the peripheral apparatus, a request required to acquire a response including information that represents whether or not the peripheral apparatus is configured to notify the information processing apparatus of an event; and an acquisition unit that acquires and saves the response from the peripheral apparatus, and the peripheral apparatus comprises: a return unit that returns a response including information that represents whether or not the peripheral apparatus is configured to notify the information processing apparatus of an event in response to the request issued from the information processing apparatus, and wherein when the information included in the response returned from the peripheral apparatus after the information processing apparatus has sent data of the print job to the peripheral apparatus is information that represents that the peripheral apparatus is configured not to notify the information processing apparatus of any event, the information processing apparatus deletes the print job from the printer queue.

Further features of the present invention will become apparent from the following description of exemplary embodiments (with reference to the attached drawings).

BRIEF DESCRIPTION OF THE DRAWINGS

FIG. 5 is a chart showing a calling sequence at the time of conventional print processing;

FIG. 6 is a chart showing a calling sequence at the time of print processing according to an embodiment;

FIG. 7 is a chart showing a calling sequence at the time of print processing according to the embodiment;

FIGS. 8A and 8B show GetPrinterElements contents, in which FIG. 8A shows the contents of a GetPrinterElementsRequest, and FIG. 8B shows the contents of a GetPrinterElementsResponse;

FIGS. 10A to 10D show an event management database, in which FIG. 10B shows a print queue database which can accept and process only one print job, and FIG. 10C shows a print queue database which can simultaneously accept and process a plurality of print jobs;

FIG. 11 is a chart showing a calling sequence at the time of print processing;

FIGS. 14A and 14B show GetActiveJobs contents, in which FIG. 14A shows the contents of a GetActiveJobsRequest, and FIG. 14B shows the contents of a GetActiveJobsResponse;

FIGS. 17A and 17B show GetPrinterElements contents, in which FIG. 17A shows the contents of a GetPrinterElementsRequest, and FIG. 17B shows the contents of a GetPrinterElementsResponse;

FIGS. 18A to 18E show a printer queue;

FIGS. 19A and 19B show CreatePrintJob contents, in which FIG. 19A shows the contents of a CreatePrintJobRequest, and FIG. 19B shows the contents of a CreatePrintJobResponse;

FIG. 22 shows JobEndStateEvent contents.

DESCRIPTION OF THE EMBODIMENTS

Embodiments for carrying out the invention will be described in detail hereinafter with reference to the drawings.

Some pieces of information, which are not especially described in detail, of those of an OS (Operating System) to be quoted in the following description, are those which have been published on the Internet, and an extra description thereof will not be given. These pieces of information are published on the Microsoft Developer Network (MSDN) site as of Apr. 12, 2010. http://msdn.microsoft.com/en-us/library/default.aspx.

In the following description, "WSD" is short for "Web Service on Devices", and is information published on the Internet. Hence, an extra description thereof will not be given. This information is published on the Windows Hardware Developer Central site as of Apr. 12, 2010. http://www.microsoft.com/whdc/connect/rally/rallywsd.mspx.

In the following description, "WSD Print Service Definition Version 1.0" has been published on the Internet, and an extra description thereof will not be given. This service is a Print Service defined by Microsoft Incorporation, U.S.A. and published on the Windows Hardware Developer Central site as of Apr. 12, 2010. http://www.microsoft.com/whdc/connect/rally/wsdspecs.mspx.

First Embodiment

Figure 1:
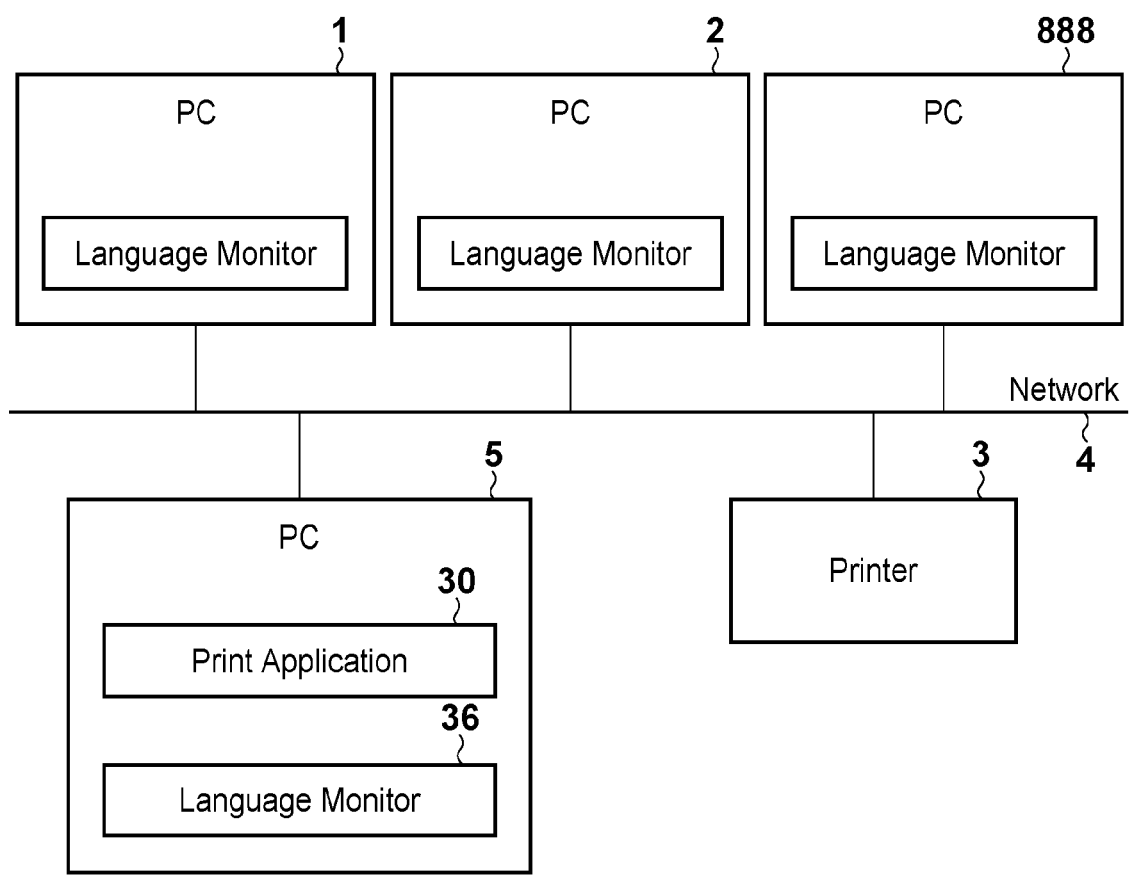
FIG. 1 is a block diagram showing the arrangement of a peripheral apparatus control system.

FIG. 1 is a block diagram showing the arrangement of a system in an embodiment of a peripheral apparatus control system including information processing apparatuses and a peripheral apparatus. Information processing apparatuses 1, 2, 5, and 888 shown in FIG. 1 are configured by general personal computers (PCs). The PCs 1, 2, 5, and 888 are configured by a hardware arrangement which will be described later using FIG. 2A. On the PCs 1, 2, 5, and 888, an OS equivalent to Windows® 7 available from Microsoft, U.S.A. is installed. Also, the PCs 1, 2, 5, and 888 are connected to an Ethernet® network 4.

A printer 3 is configured by a color ink-jet printer as an example of a peripheral apparatus of the present invention. The printer 3 is a printer with a model name "Kmmn" available from an ABC company. Note that the peripheral apparatus is not limited to the printer, but may be a copying machine, facsimile apparatus, scanner, digital camera, digital video camera, and multi-function equipment including these multiple functions. The printer 3 is configured by a hardware arrangement which will be described later using FIG. 2B, and is connected to the PCs 1, 2, 5, and 888 via the network 4, so as to be able to communicate with each other.

A print application 30 is configured by an executable file (*.exe) for Windows®. Note that the print application 30 and a language monitor 36 will be described in more detail later using FIG. 4.

Figure 2A:
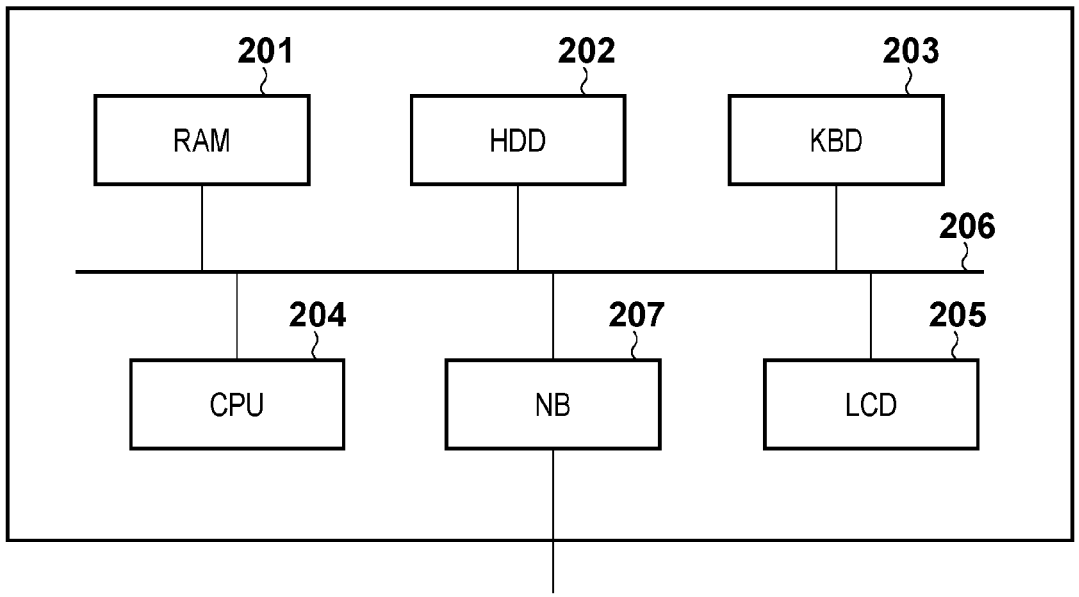
FIGS. 2A and 2B are block diagrams showing examples of the hardware arrangements of a PC and printer.
Figure 2B:
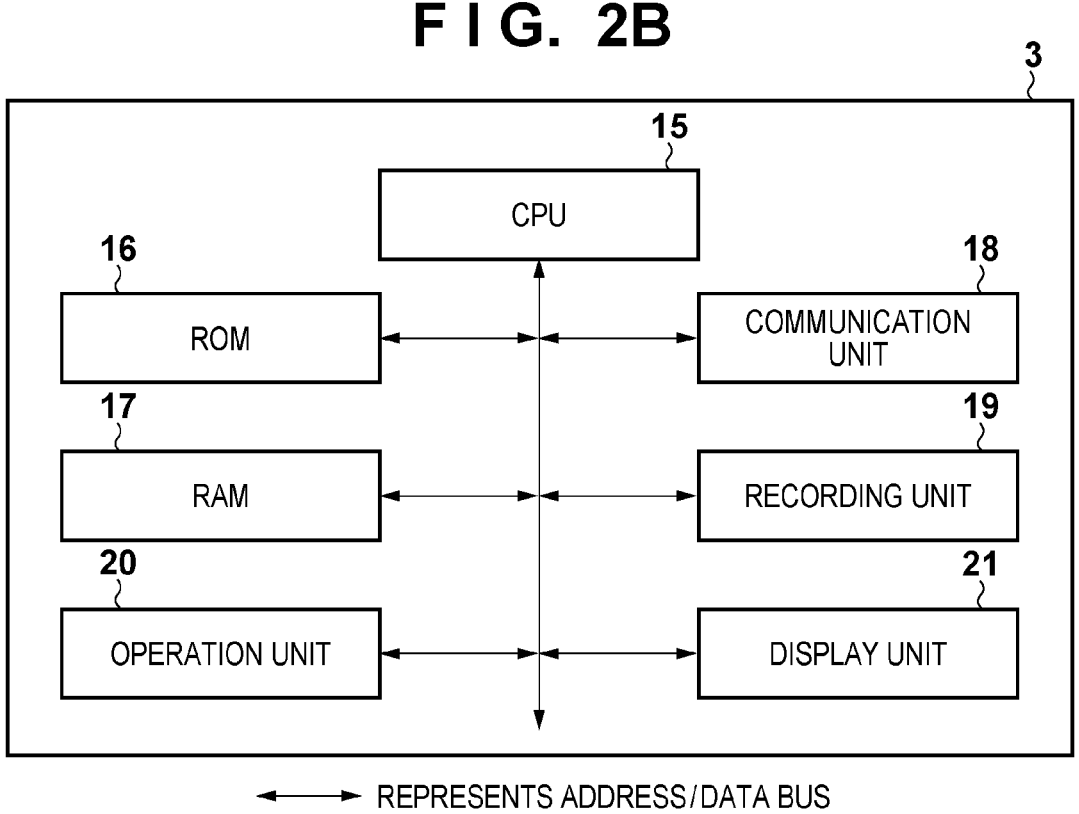

FIGS. 2A and 2B are block diagrams showing examples of the hardware arrangements of the PC and printer. The PCs 1, 2, 5, and 888 are configured by the hardware arrangement shown in FIG. 2A. The hardware arrangement of the PC 5 will be exemplified below. As shown in FIG. 2A, the PC 5 includes a RAM 201, an HDD 202 as a storage unit, a KBD 203 as an example of an input unit, a CPU 204 as a control unit, an LCD 205 as an example of a display unit, and an NB 207 as an example of a communication control unit, which are connected to a bus 206. Note that the storage unit may be a portable CD-ROM or internally mounted ROM.

Figure 3:
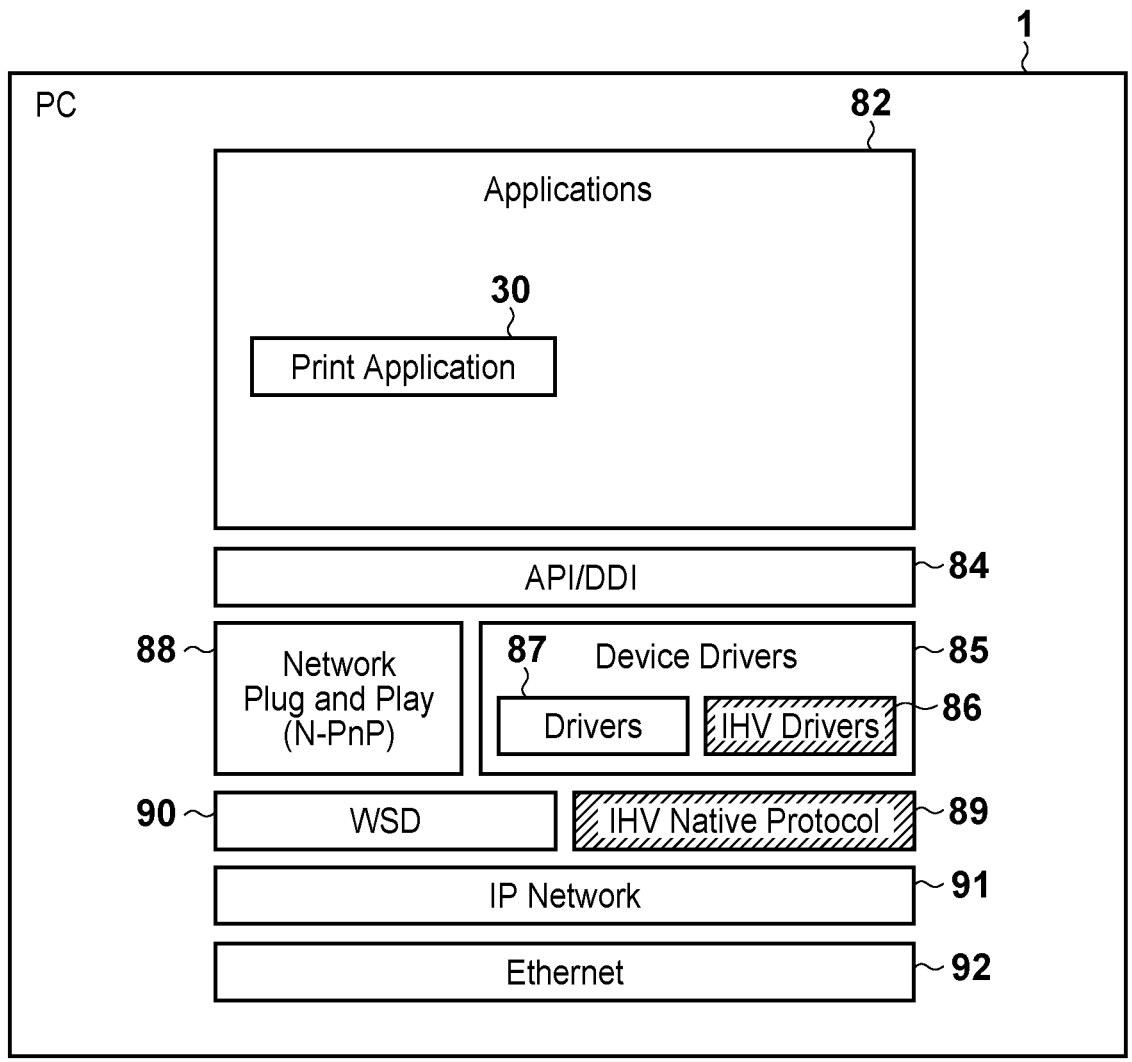
FIG. 3 is a diagram showing the software configuration of the PC.
Figure 4:
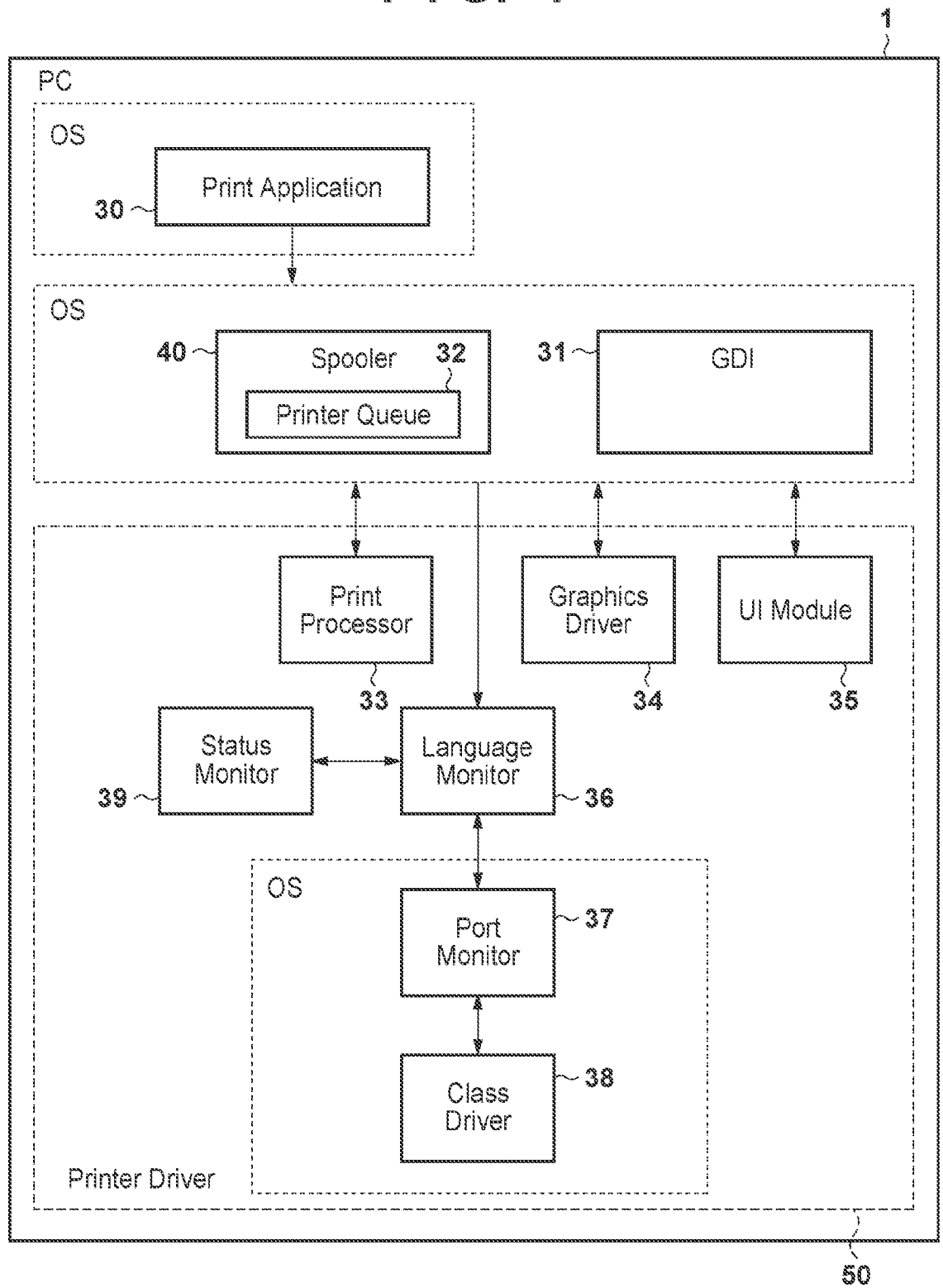
FIG. 4 is a diagram showing the configuration of a printer driver in the PC.

Respective modules (software) shown in FIGS. 3 and 4 are stored in the HDD 202, and are read out onto the RAM 201 as needed when they are executed by the CPU 204. Thus, the CPU 204 implements the functions of the respective modules (software) shown in FIGS. 3 and 4.

On the other hand, the printer 3 has the hardware arrangement shown in FIG. 2B. A CPU 15 shown in FIG. 2B is configured by a microprocessor and the like, and controls, as a central processing unit of the printer 3, a RAM 17, communication unit 18, recording unit 19, operation unit 20, and display unit 21 according to programs stored in a ROM 16.

The ROM 16 stores programs required to implement recording (printing) processing of the printer 3 and processing for notifying the PC 5 of a print operation status under the control of a printer driver (to be described later with reference to FIG. 4). The RAM 17 temporarily stores print data which is mainly sent from the PC 5, and based on which an image is printed by the recording unit 19. The communication unit 18 includes, for example, a connection port for the network 4, and controls Ethernet® communications. The recording unit 19 is configured by a recording unit including an ink-jet recording head, color inks, a carriage, a recording sheet convey mechanism, and the like, and an electric circuit including an ASIC required to generate print pulses in the recording head based on print data.

By a print operation on a print application, display contents (image data) of a file, which is opened on that application, are temporarily stored in the HDD 202 of the PC 5 as a spool file of an EMF format. The stored spool file is converted into print data including control commands for the printer 3 via a printer driver 50, and the print data is sent to the printer 3 via the network 4. The print data received by the printer 3 is converted into print pulses by the recording unit 19, and is printed on a recording sheet.

The operation unit 20 includes various buttons such as a power button and reset button, and allows the user to operate the printer 3. The display unit 21 is configured by a touch panel type liquid crystal display. The display unit 21 can display states of the printer 3 and various settings, and allows the user to input various settings.

FIG. 3 shows the software configuration of the PC. An Ethernet® control stack 92 shown in FIG. 3 controls Ethernet®. An IP network control stack 91 controls an IP network. A WSD control stack 90 controls the WSD. An IHV native protocol control stack 89 controls IHV native protocols. An N-PnP control stack 88 controls a network plug and play (N-PnP) function.

Note that standard functions of the OS as a series of plug and play extension functions, which provide supports for network-connection devices, include PnP-X (Plug and Play for Extensions). However, this embodiment will exemplify a case using the N-PnP function as a function equivalent to the PnP-X function.

Also, WSDAPIs (to be described later) required to control the WSD are included in the WSD control stack 90. Then, APIs required to control IHV native protocols (to be described later) are included in the IHV native protocol control stack 89.

Device drivers 85 include standard drivers 87 supplied with the OS, and IHV drivers 86 provided from an IHV. An application/DDI interface 84 includes an application programming interface (API) and device driver interface (DDI). Applications 82 include a print application 30 (to be described below with reference to FIG. 4) and the like.

FIG. 4 shows the configuration of a printer driver in the PC. A printer driver 50 shown in FIG. 4 is that for the printer 3, which is installed in the PC 5, and is configured by a plurality of modules 33 to 36, and 39. The print application 30 corresponds to, for example, "Notepad (Notepad.exe)" as a printable text editor supplied with the OS as a standard program. A GDI (Graphics Device Interface) 31 and spooler 40 are included in the OS. A printer queue 32 is configured as a part of this spooler 40, and enqueues print jobs. The enqueued print jobs are displayed on a printer queue folder (not shown).

In the printer driver 50, a print processor 33 changes a print layout and applies special processing to a print image. A graphics driver 34 executes image processing for printing based on rendering commands sent from the GDI 31 as a core of image processing of the printer driver, and generates print control commands. A UI module 35 provides and controls a user interface of the printer driver.

A language monitor 36 controls data sending/receiving processing as a communication I/F of data. A status monitor 39 displays statuses such as ink remaining amounts, alerts, and errors of the printer 3. A port monitor 37 executes processing for sending data received from the language monitor 36 to an appropriate port, and receiving data sent from the printer 3 via a class driver 38. Especially, a port monitor which controls the WSD print service will be referred to as "WSDMon" hereinafter.

The class driver 38 is a low-level module closest to a port. In this embodiment, the class driver 38 corresponds to a printer-class driver of the WSD or IHV native protocol, and controls the port (network port). The printer driver 50 is available from the ABC company as a manufacturer of the printer 3.

FIGS. 10A and 10D show an event management database used to manage WSD events of which the printer 3 notifies the PCs, and FIGS. 10B and 10C show a print queue database used to manage print job requests received by the printer 3. FIGS. 10A to 10D are ones of the drawings which best illustrate characteristic features of the present invention.

FIG. 10A shows an event management database used to manage WSD events of which the printer 3 notifies the PCs. In general, control of an event of which a printer notifies a PC is seriously influenced by limitations of hardware resources in that printer. As a practical example, it is difficult for the printer to notify all PCs connected on a single network of processing statuses of print jobs by means of events. For this reason, in general, the printer is designed to notify a specific limited number of PCs, which are controllable by itself, of events.

In case of an event management database 123 shown in FIG. 10A, the printer 3 can notify a maximum of two PCs, which are set in a Computer Name column, of events. A Subscribed Event column is set with events, registration of which is permitted by the printer 3, in response to registration requests of respective WSD events from the PCs. Furthermore, an ans:EventControl column saves values each set in an <ans:EventControl> element 802 in a GetPrinterElementsResponse of the WSD shown in FIG. 8B. This example indicates that the printer 3 can notify the PCs 1 and 2 of the following WSD events.

PrinterElementsChangeEvent
PrinterStatusSummaryEvent
PrinterStatusConditionEvent
PrinterStatusConditionClearedEvent
JobStatusEvent
JobEndStateEvent For example, when the PC 1 or 2 issues a print job to the printer 3, the printer 3 notifies the PC 1 or 2 of events according to processing statuses of that print job. Thus, the PC 1 or 2 can recognize the processing statuses of the print job issued by itself.

By contrast, when the PC 5 issues a print job to the printer 3, the printer 3 can accept this print job to perform a print operation, but it cannot notify the PC 5 of any event according to a processing status of that print job. As a result, the PC 5 cannot recognize the processing status of the print job issued by itself using events. The same limitations apply not only to a case in which the PCs 1, 2, and 5 issue print jobs nearly at the same time, but also to a case in which, for example, the PCs 1, 2, and 5 are connected on the network 4, and only the PC 5 issues a print job. The printer 3 cannot notify the PC 5 of events according processing statuses of that print job. This example focuses attention on, as especially important events, two events, that is, a JobStatusEvent which represents a processing status of a print job, and a JobEndStateEvent which represents that print processing is complete. This JobEndStateEvent will be described in more detail later with reference to FIG. 22.

FIG. 10B shows a print queue database used to manage received print job requests in the printer 3, which cannot simultaneously accept and process a plurality of print jobs, and accepts and processes only one print job.

In a print queue database 124, a management number (No.) column stores management numbers of print job requests in the print queue database 124. In this example, a maximum of five print job requests whose print processing is in progress or which wait for print processing in the printer 3 can be held at the same time. A next Computer Name column saves names of PCs, which issued the print job requests. A wprt:JobName column saves values each of which is set in a <wprt:JobName> element in a CreatePrintJobRequest of the WSD print job service. A wprt:JobOriginatingUserName column saves values each of which is set in a <wprt:JobOriginatingUserName> element in the CreatePrintJobRequest of the WSD print service. A wprt:JobId column saves values each of which is set in a <wprt:JobId> element in a CreatePrintJobResponse of the WSD, which is returned as a response to the print job request.

A value "1001" in the wprt:JobId column of a print job request of No. 1 has already been returned from the printer 3 to the PC 5 by a CreatePrintJobResponse as a response to a request, which was issued by the PC 5 and was accepted by the printer 3. This print job is a print job 145 shown in FIG. 18C. Values "1002" and "1003" in the wprt:JobId column of print job requests of Nos. 2 and 3 have not been returned to the PCs 1 and 2 yet since the printer 3 does not accept requests issued from the PCs 1 and 2. These values are reserved to prepare for a case in which the printer 3 will accept requests issued from the PCs 1 and 2 after it completes print processing of the print job request of No. 1.

An ans:EventControl column saves values each of which is set in the <ans:EventControl> element 802 in the GetPrinterElementsResponse of the WSD shown in FIG. 8B. A Status column saves processing statuses of the print job requests in the printer 3. FIG. 10B shows a state in which the printer 3 receives a print job request issued from the PC 5, accepts it as a request of No. 1, and is processing that request (Processing). Also, FIG. 10B shows a state in which the printer 3 receives print job requests issued from the PCs 1 and 2 and registers them in the print queue database 124 as requests of Nos. 2 and 3, but it does not accept and process these requests (Not Accepted).

FIG. 10C shows a print queue database used to manage received print job requests in the printer 3, which cannot simultaneously accept and process a plurality of print jobs, and accepts and processes only one print job. Note that a description about contents which have already been explained using FIG. 10B will not be repeated.

Upon completion of the print processing of the print job request of No. 1, which was processed by the printer 3 in FIG. 10B, the states of the print queue database 124 transit to those shown in FIG. 10C. Then, FIG. 10C shows a state in which the printer 3 receives the print job requests issued from the PCs 1 and 2, and re-registers them in the print queue database 124 as print job requests of Nos. 1 and 2. Also, FIG. 10C shows a state in which the printer 3 accepts and processes the print job request of No. 1 of these print job requests (Processing), and it does not accept and process the print job request of No. 2 (Not Accepted). The print job of No. 1 is a print job 144 shown in FIG. 18A.

FIG. 5 shows a calling sequence at the time of conventional print processing. Now assume that the printer 3 cannot accept a plurality of print jobs, and can accept only one print job. In FIG. 5, when the user starts print processing from the application 30 (S501), the OS calls a StartPrintJob( ) function of the spooler 40 (S502). In this function, the spooler 40 calls an LM_StartDocPort( ) function of the language monitor 36

(S504). In this function, the language monitor 36 calls a PM_StartDocPort( ) function of the port monitor 37 (S506). In this function, the port monitor 37 executes appropriate processing as needed (S507), substitutes a processing result in a return value pmRet, and ends this function. Then, the control returns to the call source (S508).

Normally, when the processing is normally done, "TRUE" is substituted in the return value pmRet; otherwise, "FALSE" is substituted in the return value pmRet. The language monitor 36 substitutes the return value of the PM_StartDocPort( ) function in lmRet (S505), and ends the LM_StartDocPort( ) function. Then, the control returns to the call source (S509).

The spooler 40 substitutes the return value of this LM_StartDocPort( ) function in spRet (S503). In this case, when spRet≠TRUE (=FALSE) (S510), the spooler 40 calls the LM_StartDocPort( ) function of the language monitor 36 again (S504). On the other hand, when spRet=TRUE, the spooler 40 calls an LM_WritePort( ) function of the language monitor 36 (S512). In this function, the language monitor 36 calls a PM_WritePort( ) function of the port monitor 37 (S514). In this function, the port monitor 37 calls a CreatePrintJob( ) function of the WSDAPIs required to control the WSD. In this function, the port monitor 37 issues a WSD print service request (CreatePrintJobRequest) to the printer 3.

This request includes detailed information associated with this print job. In response to this request, the printer 3 returns a response (CreatePrintJobResponse) or Fault (ServerErrorNotAcceptingJobs) to the port monitor 37 (S516). When the printer 3 is ready to accept a print job, and accepts that print job in practice, it returns a response to the port monitor 37. However, when the printer 3 is not ready to accept any print request, it returns Fault to the port monitor 37.

Upon reception of the return value of the CreatePrintJob( ) function from the printer 3, the port monitor 37 substitutes it in pmRet (S515), and ends the PM_WritePort( ) function. Then, the control returns to the call source (S517). Upon reception of pmRet, the language monitor 36 substitutes the return value of the PM_WritePort( ) function in lmRet (S513), and ends the LM_WritePort( ) function. Then, the control returns to the call source (S518).

The spooler 40 substitutes the return value of this LM_WritePort( ) function in spRet (S511). In this case, when spRet≠TRUE (=FALSE) (S519), the spooler 40 calls the LM_WritePort( ) function of the language monitor 36 again (S512). On the other hand, when spRet=TRUE, the spooler 40 successively executes print data sending processing. This sending processing will be described in more detail later with reference FIG. 7.

Finally, the spooler 40 calls an LM_EndDocPort( ) function of the language monitor 36 (S521). In this function, the language monitor 36 calls a PM_EndDocPort( ) function of the port monitor 37 (S523). In this function, the port monitor 37 launches a notification waiting process of an event (JobEndStateEvent) which represents that the print processing is complete (S524).

The port monitor 37 executes appropriate processing as needed (S525), substitutes a processing result in the return value pmRet, and ends this function. Then, the control returns to the call source (S526). Normally, when the processing is normally done, "TRUE" is substituted in the return value; otherwise, "FALSE" is substituted in the return value. The language monitor 36 substitutes the return value of the PM_EndDocPort( ) function in lmRet (S522), and ends the LM_EndDocPort( ) function. Then, the control returns to the call source (S527).

The spooler 40 substitutes the return value of this LM_EndDocPort( ) function in spRet (S520), and ends the StartPrintJob( ) function. Then, the control returns to the call source (S528). When the port monitor 37 receives a notification of that event from the printer 3 in the aforementioned event notification waiting process, it deletes the notified print-ended print job from the printer queue 32.

In the case of FIGS. 10A and 10C, when the printer 3 executes print processing for the print job request issued from the PC 1, the printer queue displays a print job 144 shown in FIG. 18A with a status "Printing". After that, the printer 3 notifies the PC 1 of a print end event upon completion of the print processing. Upon reception of this event in the notification waiting processing of that event, the port monitor 37 in the PC 1 deletes the print job 144 from the printer queue in the PC 1. As a result, as shown in FIG. 18B, the print job 144 is deleted from the printer queue in the PC 1, and ceases to be displayed.

Even in the case of FIGS. 10A and 10B, the printer 3 can accept a print job request issued from the PC 5, and can execute its print processing. Then, when that print job is executed, the printer queue 32 in the PC 5 displays a print job 145 with a status "Printing", as shown in FIG. 18C.

However, the printer 3 cannot notify the PC 5 of any print end event upon completion of the print processing. As a result, the port monitor 37 in the PC 5 cannot receive any event which represents that the print processing of the print job 145 issued from the PC 5 is complete in the notification waiting processing of that event. As a result, as shown in FIG. 18D, the print job 145 with a status "Sent to printer" is unwantedly left in the print queue 32 in the PC 5.

That is, a print job from a PC such as the PC 5 to which the printer 3 cannot notify this event is unwantedly left in the printer queue to have a status "Sent to printer" although its print processing is complete.

FIGS. 6 and 11 show a calling sequence at the time of print processing. These drawings are ones of those which best illustrate characteristic features of the present invention. Now assume that the printer 3 is a low-cost printer, which accepts only one print job request, can process that print job to execute print processing, and can notify only two PCs, that is, the PCs 1 and 2, of events, as shown in FIG. 10A.

In FIG. 6, when the user starts print processing from the application 30 (S601), the OS calls the StartPrintJob( ) function of the spooler 40 (S602). In this function, the spooler 40 calls the LM_StartDocPort( ) function of the language monitor 36 (S604). In this function, the language monitor 36 initializes a flag lmDeleteJob by substituting "FALSE" in that flag (S605). This flag is used in the language monitor 36, and is set with "TRUE" when the printer 3 cannot notify a PC which issued the print job of an event which represents that the print job is complete. Otherwise, that flag is set with "FALSE". The language monitor 36 initializes lmJobId by substituting "0" in it (S606). After that, the language monitor 36 executes the same processes as in steps S505 to S509 shown in FIG. 5.

The spooler 40 substitutes the return value of this LM_StartDocPort( ) function, which is returned by the same process as in step S509, in spRet (S603). When spRet≠TRUE (=FALSE) (S607), the spooler 40 calls the LM_StartDocPort( ) function of the language monitor 36. On the other hand, when spRet=TRUE, the process advances to step S1101 in FIG. 11. Processing for issuing a print job request and acquiring print job information shown in FIG. 11 will be described later.

Finally, the spooler 40 calls the LM_EndDocPort( ) function of the language monitor 36 (S609). In this function, the language monitor 36 calls a GetPrinterElements( ) function of the WSDAPIs required to control the WSD by setting wprt:

PrinterDescription in its argument. In this function, the port monitor 37 issues a WSD print service request (GetPrinterElementsRequest) to the printer 3. In response to this request, the printer 3 returns a response (GetPrinterElementsResponse) to the port monitor 37 (S611). Upon reception of the response, the port monitor 37 substitutes "TRUE" in a return value of the GetPrinterElements( ) function, and the control then returns to the call source (S610).

On the other hand, when the port monitor 37 does not receive any response within a predetermined time period after it issued the request to the printer 3, it substitutes "FALSE" in the return value of the GetPrinterElements( ) function, and the control then returns to the call source (S610).

The language monitor 36 substitutes the return value of the GetPrinterElements( ) function in lmRet. Note that in this embodiment, a description of an error case in which "FALSE" is returned as the return value of the GetPrinterElements( ) function will not be given. The request issued by the port monitor 37, and the response which is returned by the printer 3 in response to the request, will be described in detail later with reference to FIGS. 8A and 8B.

The language monitor 36 acquires a value set in a <wprt:DeviceId> element 804 in the response passed as the argument of the GetPrinterElements( ) function in step S610, and determines a status of the printer 3. The language monitor 36 determines whether or not a value set in "INFO:" included in the acquired value is "000" which represents that the printer is online and in a standby state, that is, the value set in the <wprt:DeviceId> element 804 includes "INFO:000" (S612). In this case, when the printer 3 is online and in the standby state, this means that the print processing is complete. When the language monitor 36 determines in step S612 that the value set in the <wprt:DeviceId> element 804 includes "INFO:000", it executes the same processes as in steps S522 to S526 in FIG. 5. However, when the language monitor 36 determines in step S612 that the acquired value does not include "INFO:000", the process returns to step S610.

At this time, the language monitor 36 substitutes the return value of the PM_EndDocPort( ) function in lmRet by the same process as in step S522. The language monitor 36 confirms the value set in lmDeleteJob. When "TRUE" is set (S613), the language monitor 36 executes print job delete processing in steps S1304 and S1306 shown in FIG. 13 (S614). For example, when the language monitor 36 deletes this print job in step S1306 in FIG. 13, the print job with a status "Sent to printer" (a print job 145 in FIG. 18C) is deleted from the printer queue 32 (FIG. 18E). The language monitor 36 initializes lmDeleteJob by substituting "FALSE" in it (S615). Also, the language monitor 36 initializes lmJobId by substituting "0" in it (S616).

The language monitor 36 returns the value of lmRet as the return value of the LM_EndDocPort( ) function, and ends the LM_EndDocPort( ) function. Then, the control returns to the call source (S617). Details of the processes of the LM_EndDocPort( ) function in steps S609 to S617 will be described later with reference to FIG. 13. The spooler 40 substitutes the return value of this LM_EndDocPort( ) function in spRet (S608), and ends the StartPrintJob( ) function. Then, the control returns to the call source (S618).

In FIG. 11, the spooler 40 calls the LM_WritePort( ) function of the language monitor 36 (S1102). In this function (S1103), the language monitor 36 calls the PM_WritePort( ) function of the port monitor 37 (S1104). In this function (S1105), the port monitor 37 calls the CreatePrintJob( ) function of the WSDAPIs required to control the WSD (S1106). In this function, the PC (PC 5) issues a print job request, that is, a WSD print service request (CreatePrintJobRequest) to the printer 3. This request includes detailed information associated with this print job. In response to this request, the printer 3 returns a response (CreatePrintJobResponse) or Fault (ServerErrorNotAcceptingJobs) to the port monitor 37 (S1107).

When the printer 3 is ready to accept a print job request and to execute the accepted request, and accepts that print job request in practice, it returns a response to the port monitor 37 which issued that print job request. On the other hand, when the printer 3 is not ready to accept any print job request, and does not accept the print job request, it returns Fault to the port monitor 37 which issued that print job request.

Upon reception of the response, the port monitor 37 substitutes "TRUE" in the return value of the CreatePrintJob( ) function, and the control then returns to the call source (S1106). At this time, the printer 3 sets a value saved in the wprt:JobId column in FIGS. 10B and 10C in a <wprt:JobId> element in the response. On the other hand, upon reception of Fault, the port monitor 37 substitutes "FALSE" in the return value of the CreatePrintJob( ) function, and the control then returns to the call source (S1106). The port monitor 37 substitutes the return value of the CreatePrintJob( ) function in the return value pmRet (S1106), and ends the PM_WritePort( ) function. Then, the control returns to the call source (S1108).

The language monitor 36 substitutes the return value of the PM_WritePort( ) function in lmRet (S1104). The language monitor 36 confirms the value of lmRet (S1109). When lmRet=TRUE, the process advances to step S1110; otherwise (lmRet=FALSE), the process advances to step S1117. In step S1110, the language monitor 36 calls the GetPrinterElements( ) function of the WSDAPIs required to control the WSD by setting wprt:PrinterDescription in its argument. In this function, the port monitor 37 issues a WSD print service request (GetPrinterElementsRequest) to the printer 3. In response to this request, the printer 3 returns a response (GetPrinterElementsResponse) to the port monitor 37 (S1111).

Upon reception of the response, the port monitor 37 substitutes "TRUE" in a return value of the GetPrinterElements( ) function, and the control then returns to the call source (S1110). On the other hand, when the port monitor 37 does not receive any response within a predetermined time period after it issued the request to the printer 3, it substitutes "FALSE" in the return value of the GetPrinterElements( ) function, and the control then returns to the call source (S1110). In step S1110, the language monitor 36 substitutes the return value of the GetPrinterElements( ) function in lmRet. Note that in this embodiment, a description of an error case in which "FALSE" is returned as the return value of the GetPrinterElements( ) function will not be given. The request issued by the port monitor 37, and the response which is returned by the printer 3 in response to the request in step S1110 will be described in detail later with reference to FIGS. 8A and 8B.

The language monitor 36 acquires a value set in an <ans:EventControl> element 802 in the response passed as the argument of the GetPrinterElements( ) function in step S1110, and compares it with "false" (S1112). When the language monitor 36 determines "false" in step S1112, it substitutes "TRUE" in lmDeleteJob (S1113). At this time, a value set in the <wprt:DeviceId> element 804 is the following value, and it reveals that the printer 3 is in an "INFO:001" state indicating that the print processing is in progress (Processing).

"MFG:ABC;CMD:ABCCommand;MDL:Kmmn;CLS:PRINTER;DES:ABC Kmmn;VER:1.00;INFO:001;"

The language monitor 36 calls a GetActiveJobs function of the WSDAPIs required to control the WSD (S1114). In this function, the port monitor 37 issues a WSD print service request (GetActiveJobsRequest) to the printer 3. In response to this request, the printer 3 returns a response (GetActiveJobsResponse) to the port monitor 37 (S1115). Upon reception of the response, the port monitor 37 substitutes "TRUE" in a return value of the GetActiveJobs function, and the control returns to the call source (S1114). On the other hand, when the port monitor 37 does not receive any response within a predetermined time period after it issued the request to the printer 3, it substitutes "FALSE" in the return value of the GetActiveJobs function, and the control then returns to the call source (S1114). In step S1114, the language monitor 36 substitutes the return value of the GetActiveJobs function in lmRet.

Note that in this embodiment, a description of an error case in which "FALSE" is returned as the return value of the GetActiveJobs function will not be given. The request issued by the port monitor 37, and the response which is returned by the printer 3 in response to the request in step S1114 will be described in detail later with reference to FIGS. 14A and 14B.

The language monitor 36 acquires a value of a <wprt:JobId> element 1402 in the response passed as the argument of the GetActiveJobs function in step S1114, and substitutes the acquired value in lmJobId (S1116). The language monitor 36 ends the LM_WritePort( ) function, and the control then returns to the call source (S1117). At this time, as the return value of the LM_WritePort( ) function, the value of lmRet is returned (S1117).

The spooler 40 substitutes the return value of this LM_WritePort( ) function in spRet (S1102). When spRet≠TRUE (=FALSE) (S1118), the process returns to step S1102, and the spooler 40 calls the LM_WritePort( ) function of the language monitor 36. When spRet=TRUE in step S1118, the spooler 40 successively executes print data sending processing shown in FIG. 7. After that, the language monitor 36 executes the processes in steps S609 to S617 in FIG. 6, and the spooler 40 executes the process in step S618 in FIG. 6, thus ending the print processing.

As described above, in the case of FIGS. 10A and 10B, the print-ended print job 145 can be automatically deleted from the printer queue 32 in the PC 5, as shown in FIG. 18E, resulting in high user's operability.

FIG. 7 shows a calling sequence at the time of print processing. When spRet=TRUE in step S519 in FIG. 5 or step S1118 in FIG. 11, the spooler 40 calls the LM_WritePort( ) function of the language monitor 36 (S702). In this function, the language monitor 36 calls the PM_WritePort( ) function of the port monitor (S704). In this function, the port monitor 37 calls a SendDocument( ) function of the WSDAPIs required to control the WSD. In this function, the PC issues a WSD print service request (SendDocumentRequest) to the printer 3. In this case, the PC uses MTOM (Message Transmission Optimization Mechanism) message encoding. Then, the PC sends print data configured by print control commands as non-processed bytes using a SOAP message to the printer 3.

In response to this request, the printer 3 returns a response (SendDocumentResponse) to the port monitor 37 (S706). When the port monitor 37 receives this response and has sent all print data to the printer 3, it substitutes "TRUE" in a return value of the SendDocument( ) function, and the control returns to the call source (S705). When an arbitrary error has occurred at the time of issuance of the request or at the time of reception of the response by the port monitor 37, the port monitor 37 substitutes "FALSE" in the return value of the SendDocument( ) function, and the control returns to the call source (S705). The port monitor 37 substitutes the return value of the SendDocument( ) function in the return value pmRet (S705), and ends the PM_WritePort( ) function. Then, the control returns to the call source (S707).

The language monitor 36 substitutes the return value of the PM_WritePort( ) function in lmRet (S703), and ends the LM_WritePort( ) function. The control then returns to the call source (S708). The spooler 40 substitutes the return value of this LM_WritePort( ) function in spRet (S701). In this case, when spRet≠TRUE (=FALSE) (S709), the process returns to step S701, and the spooler 40 calls the LM_WritePort( ) function of the language monitor 36. On the other hand, when spRet=TRUE, the process advances to step S520 in FIG. 5 or step S608 in FIG. 6.

FIGS. 19A and 19B show the CreatePrintJob contents, and FIGS. 8A and 8B and FIGS. 17A and 17B show the GetPrinterElements contents. FIGS. 14A and 14B show the GetActiveJobs contents, and FIG. 22 shows the JobEndStateEvent contents. A CreatePrintJob operation is a print job start request. A GetPrinterElements operation is normally used to acquire information associated with a printer. A GetActiveJobs operation is normally used to acquire information associated with a print job whose processing is in progress in a printer. A JobEndStateEvent is a print end event indicating completion of a print job. Since the general contents of CreatePrintJob, GetPrinterElements, and GetActiveJobs are defined in the WSD Print Service Definition Version 1.0, a description thereof will not be given.

FIGS. 19A and 19B show the CreatePrintJob contents. FIG. 19A shows the contents of the CreatePrintJobRequest, and FIG. 19B shows the contents of the CreatePrintJobResponse.

FIG. 19A shows an example of the request which is issued by the PC 5 to the printer 3. As shown in FIG. 19A, the request includes a description 1905 which defines a name space of a WSD print service as a name space name wprt. An effective range of the name space name wprt includes public information defined by the WSD Print Service Definition Version 1.0. In the subsequent figures, the name space name wprt is similarly handled, and the effective range of the name space name wprt represents public information defined by the WSD Print Service Definition Version 1.0.

A <wprt:JobDescription> element 1901 is public information, which includes information associated with a print job. A <wprt:JobName> element 1902 is public information, in which a print job name is set. This example represents a state in which a print job name "Photo2" which is the same as that in a Document Name field of the print job 145 shown in FIG. 18C is set.

A <wprt:JobOriginatingUserName> element 1903 is public information, in which a user name who issued this print job is set. This example represents a state in which a user name "Natsu" which is the same as that in an Owner field of the print job 145 shown in FIG. 18C is set.

FIG. 19B shows an example of the response which is returned from the printer 3 to the PC 5. A <wprt:JobId> element 1904 is public information, in which a job ID assigned by the printer 3 to identify a print job requested from the PC 5 is set. This example represents a state in which a job ID "1001" (in a wprt:JobId column of a print job request of No. 1 in FIG. 10B) is set.

FIGS. 8A and 8B show the GetPrinterElements contents. FIG. 8A shows the contents of the GetPrinterElementsRequest, and FIG. 8B shows the contents of the GetPrinterElementsResponse. FIGS. 8A and 8B are ones of the drawings which best illustrate characteristic features of the present invention.

FIG. 8A shows an example of the request which is issued by the PC 5 to the printer 3. A <wprt:Name> element 801 of this request is public information, in which wprt:PrinterDescription is set as its value.

FIG. 8B shows an example of the response which is returned from the printer 3 to the PC 5. Upon reception of the request including the <wprt:Name> element 801 set with wprt:PrinterDescription, the printer 3 returns wprt:PrinterDescription to the PC 5 using this response.

This response includes a description 806 which defines a name space of WSD print services of the ABC company as a name space name ans. An effective range of the name space name ans includes private information defined by the WSD print services of the ABC company. In the subsequent figures, the name space name ans is similarly handled, and the effective range of the name space name ans represents private information defined by the WSD print services of the ABC company.

A <wprt:ElementData> element 803 is public information, in which wprt:PrinterDescription of public information is set as a Name attribute. This represents that this response includes wprt:PrinterDescription designated by the <wprt:Name> element 801. A <wprt:PrinterDescription> element 805 is public information, which includes information associated with, for example, functions incorporated in the printer 3.

A <wprt:DeviceId> element 804 is pubic information, in which data (character string) defined by "Device ID" of IEEE 1284-2000 is set. This represents a Device ID of the printer 3. This example represents a state in which a Device ID "MFG:ABC;CMD:ABCCommand;MDL:Kmmn;CLS:PRINTER; DES:ABC Kmmn;VER:1.00;INFO:001;" is set. This Device ID includes information INFO:xxx (xxx assumes one of following values) indicating a state of the printer 3, and states indicated by this information are as follows.

| INFO: | |
|---|---|
| 000 | online and standby state |
| 001 | print processing in progress (Processing) |

An <ans:EventControl> element 802 is private information, which indicates whether or not the printer 3 can notify a PC of a WSD event. When the printer 3 can notify that PC of a WSD event, "true" is set in the element 802; otherwise, "false" is set in the element 802. This example represents a state in which "false" is set, and the printer 3 cannot notify the PC of a WSD event.

An <ans:MultipleJobsControl> element 807 is private information, which represents whether or not the printer 3 can accept and process only print job or can simultaneously accept and process a plurality of print job requests. When the printer 3 can accept and process only print job, "false" is set in the element 807; when it can simultaneously accept and process a plurality of print job requests, "true" is set in the element 807. This example represents a state in which "false" is set, and the printer 3 is that which can accept and process only print job.

FIGS. 14A and 14B show the GetActiveJobs contents. FIG. 14A shows the contents of the GetActiveJobsRequest, and FIG. 14B shows the contents of the GetActiveJobsResponse. In this case, FIG. 14A shows an example of the request, which is issued by the PC 5 to the printer 3. FIG. 14B shows an example of the response which is returned from the printer 3 to the PC 5.

A <wprt:ActiveJobs> element 1403 is public information, which represents information associated with all print jobs, which are being processed by the printer 3. A <wprt:JobSummary> element 1401 is public information, which represents information associated with respective print jobs, which are being processed by the printer 3, for each print job.

The <wprt:ActiveJobs> element 1403 includes zero to a plurality of <wprt:JobSummary> elements. FIG. 14B represents a case in which the <wprt:ActiveJobs> element 1403 includes only one <wprt:JobSummary> element 1401 which represents the print job 145 shown in FIG. 18C (the print job of No. 1 in FIG. 10B). A print-ended print job is not included in the <wprt:ActiveJobs> element 1403.

Therefore, in the following case, the <wprt:ActiveJobs> element 1403 in the response from the printer 3 in response to the request from the PC does not include any <wprt:JobSummary> element 1401 of the print job 145. That is, after the state shown in FIG. 10B had changed to a state in which the print processing of the print job 145 was complete, when the next print job (the print job 144 shown in FIG. 18A) has been started to change the state to that shown in FIG. 10C, the <wprt:JobSummary> element 1401 of the print job 145 is not included in the <wprt:ActiveJobs> element 1403. With this response, the PC 5 can recognize using the GetActiveJobs operation that the print processing of the print job 145 is complete.

A <wprt:JobId> element 1402 is public information, in which a job ID of a print job is set. This job ID is the same as that set in the <wprt:JobId> element 1904 in the CreatePrintJobResponse shown in FIG. 19B, which was returned from the printer 3 to the PC 5 at the time of acceptance of this print job. This case represents a state in which the job ID "1001", which was assigned, by the printer 3, to the print job 145 shown in FIG. 18C issued by the PC 5, is set.

A <wprt:JobState> element 1404 is set with a value which represent a status (processing condition) of a print job. This case represents a state in which a value indicted by a Status column shown in FIG. 10B of the print job 145 is set. A <wprt:JobName> element 1405 is public information, in which a print job name of this print job is set. This print job name is the same as that set in the <wprt:JobName> element 1902 of the CreatePrintJobRequest shown in FIG. 19A.

A <wprt:JobOriginatingUserName> element 1406 is public information, in which a user name who issued a print job is set. This user name is the same as that set in the <wprt:JobOriginatingUserName> element 1903 of the CreatePrintJobRequest shown in FIG. 19A.

FIG. 22 shows the JobEndStateEvent contents. FIG. 22 shows an example of the event of which the printer 3 notifies the PC 1. That is, FIG. 22 shows an example in which the print processing of the print job 144 shown in FIG. 18A in the printer 3 is complete, and a state has transited to the state shown in FIG. 18B.

A <wprt:JobEndStateEvent> element 2201 is public information, which represents a print end event (JobEndStateEvent) indicating that the print job is complete. A <wprt:JobEndState> element 2202 is public information which represents detailed information of this print end event.

A <wprt:JobId> element 2203 is public information, in which a job ID of a print job is set. This job ID is the same as that set in a <wprt:JobId> element (not shown) in a response which was returned from the printer 3 to the PC 1 at the time of acceptance of this print job. This example represents a state in which a job ID "1002" (in a wprt:JobId column of a print job request of No. 1 in FIG. 10C), which was assigned, by the printer 3, to the print job 145 shown in FIG. 18A issued by the PC 1, is set.

A <wprt:JobCompletedState> element 2204 is public information, which represents a state at the time of completion of a print job. This example represents a state in which "Completed" that represents normal completion of a print job is set. A <wprt:JobCompletedStateReasons> element 2205 is public information, which includes one or a plurality of reasons when a print job is complete.

A <wprt:JobCompletedStateReason> element 2206 is public information, which represents a reason of a state when a print job is complete. This example represents a state in which "JobCompletedSuccessfully" which indicates normal completion of a print job is set. A <wprt:JobName> element 2207 is public information, in which a print job name of a print job is set. This print job name is the same as that set in a <wprt:JobName> element in the request issued by the PC 1.

A <wprt:JobOriginatingUserName> element 2208 is public information, in which a user name who issued a print job is set. This user name is the same as that set in a <wprt:JobOriginatingUserName> element (not shown) in the request issued by the PC 1.

FIGS. 18A to 18E show printer queues. FIGS. 18A and 18B show the printer queue in the PC 1, and FIGS. 18C to 18E show that in the PC 5. Each of these printer queues allows the user to select "Properties" from an upper left "Printer" menu to open properties of this printer queue. Then, an "Advanced" sheet in the properties includes a unit for selecting a "leave document after printing" function (not shown). The user can switch ON/OFF of this function. Note that a default setting value of this function is OFF.

In FIG. 18A, the print job 144 is issued by the PC 1 to the printer 3. As can be seen from FIG. 18A, since "Printing" is displayed in a Status field of the print job 144, the print processing of the print job 144 is in progress in the printer 3.

FIG. 18B shows a state after the print processing of the print job 144, which was in progress in FIG. 18A, is complete in the printer 3. As can be seen from FIG. 18B, the print-ended print job 144 is deleted from the printer queue in the PC 1, and ceases to be displayed. Note that the following processing is executed during a status transition of the printer queue in the PC 1 from FIG. 18A to FIG. 18B. When the PC 1 has transferred all print data of the print job 144 to the printer 3, a value in the Status field of the print job 144 is changed to "Sent to printer" in the printer queue in the PC 1. After that, when the print processing is complete in the printer 3, the print job 144 is deleted from the printer queue in the PC 1.

In FIG. 18C, the print job 145 is issued by the PC 5 to the printer 3. As can be seen from FIG. 18C, since "Printing" is displayed in a Status field of the print job 145, the print processing of the print job 145 is in progress in the printer 3.

FIG. 18D shows a state after the print processing of the print job 145, which was in progress in FIG. 18C, is complete in the printer 3. FIG. 18D shows a state in which the PC 5 has transferred all print data of the print job 145 to the printer 3, and the print processing of the print job 145 is complete in the printer 3. However, the print job 145 is unwantedly left in the printer queue 32 in the PC 5 to have a status "Sent to printer". This is the problem of the related art to be solved by the present invention.

FIG. 18E shows a state in which the print job 145, which was unwantedly left in the printer queue 32 in the PC 5 in the state of FIG. 18D, is deleted from the printer queue 32, and ceases to be displayed. FIG. 18E demonstrates an example in which the present invention solves the problem of the related art, and is excellent in user's operability.

Figure 12:
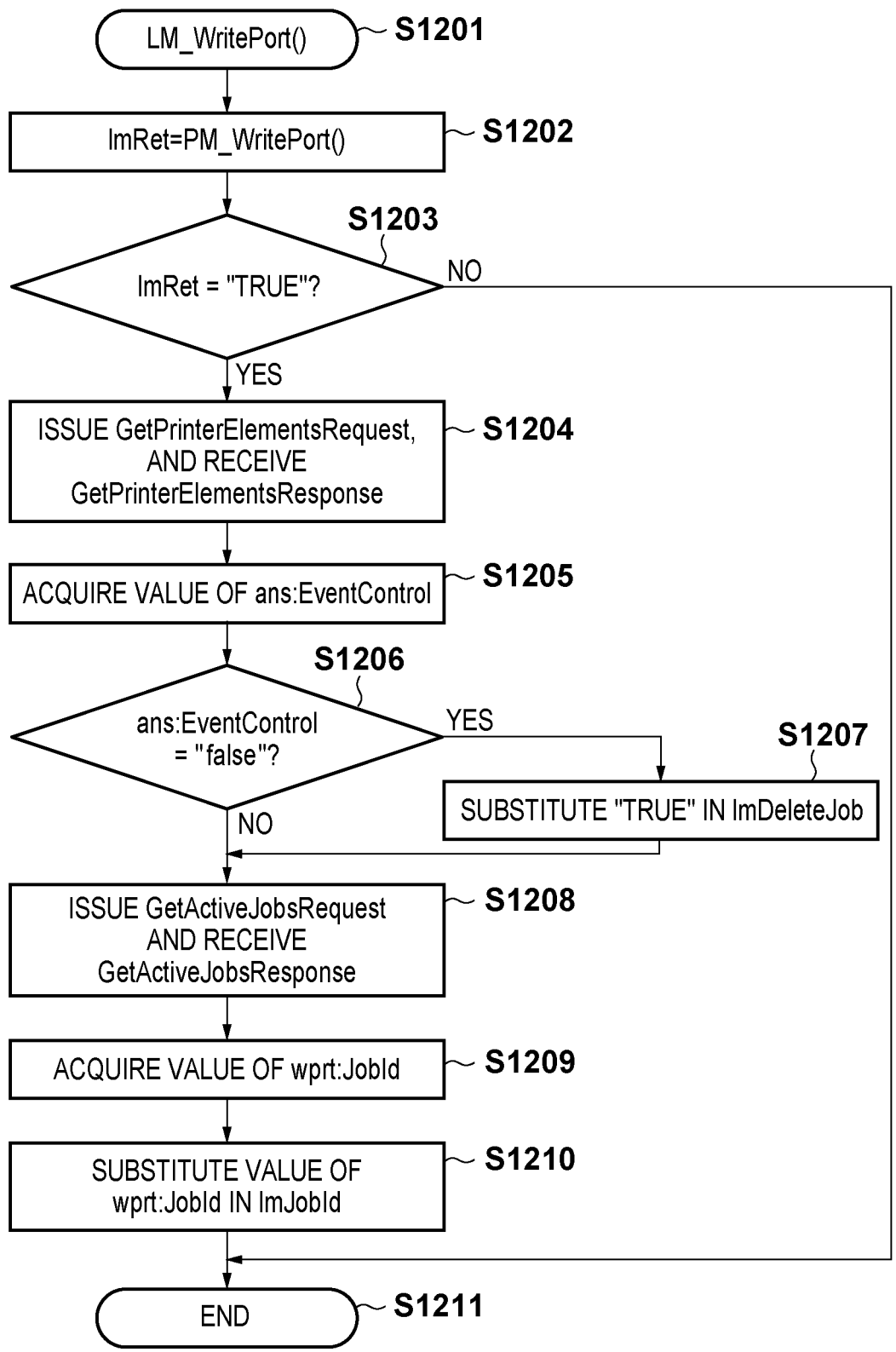
FIG. 12 is a flowchart showing processing of an LM_WritePort( ) function in a language monitor 36.

FIG. 12 is a flowchart showing the processing of the LM_WritePort( ) function in the language monitor 36. FIG. 12 is one of the drawings, which best illustrate characteristic features of the present invention. A program according to the sequence shown in FIG. 12 is stored in the HDD 202, is read out onto the RAM 201, and is executed by the CPU 204.

When the spooler 40 calls the LM_WritePort( ) function of the language monitor 36 in step S1102 in FIG. 11, the language monitor 36 starts processing of the LM_WritePort( ) function in FIG. 12 (S1201). The language monitor 36 calls the PM_WritePort( ) function of the port monitor 37, and substitutes the return value of that function in lmRet (S1202). The language monitor 36 confirms the value of lmRet in step S1203. If lmRet=TRUE, the process advances to step S1204; otherwise (lmRet=FALSE), the process jumps to step S1211.

In step S1204, the language monitor 36 calls the GetPrinterElements( ) function of the WSDAPIs required to control the WSD by setting wprt:PrinterDescription in its argument. In this function, the PC 5 issues a WSD print service request (GetPrinterElementsRequest) to the printer 3 (S1204, S1110 in FIG. 11). In response to this request, the printer 3 returns a response (GetPrinterElementsResponse) to the PC 5 (S1204, S1111 in FIG. 11). Upon reception of this response, the PC 5 substitutes "TRUE" in the return value of the GetPrinterElements( ) function, and the control returns to the language monitor 36 as a call source (S1204, S1110 in FIG. 11).

When the PC 5 does not receive any response within a predetermined time period since it issued the request to the printer 3, "FALSE" is substituted in the return value of the GetPrinterElements( ) function. Then, the control returns to the language monitor 36 as a call source (S1204, S1110 in FIG. 11). The language monitor 36 substitutes the return value of the GetPrinterElements( ) function in lmRet (S1204, S1110 in FIG. 11).

Note that in this embodiment, a description of an error case in which "FALSE" is returned as the return value of the GetPrinterElements( ) function will not be given. Details of the request issued by the PC 5 and the response which is returned by the printer 3 in response to that request in step S1204 are shown in FIGS. 8A and 8B.

The language monitor 36 acquires a value set in the <ans:EventControl> element 802 in the response passed as the argument of the GetPrinterElements( ) function (S1205). The language monitor 36 confirms in step S1206 whether or not this value is "false". If the acquired value is "false", the process advances to step S1207; otherwise (the acquired value is "true"), the process advances to step S1208.

In step S1207, the language monitor 36 substitutes "TRUE" in lmDeleteJob, and the process advances to step S1208. In step S1208, the language monitor 36 calls the GetActiveJobs function of the WSDAPIs required to control the WSD (S1114 in FIG. 11). In this function, the PC 5 issues a WSD print service request (GetActiveJobsRequest) to the printer 3 (S1208, S1114 in FIG. 11).

In response to this request, the printer 3 returns a response (GetActiveJobsResponse) to the PC 5 (S1208, S1115 in FIG. 11). Upon reception of this response, the PC 5 substitutes "TRUE" in the return value of the GetActiveJobs function, and the control returns to the call source (S1208, S1114 in FIG. 11).

When the PC 5 does not receive any response within a predetermined time period since it issued the request to the printer 3, it substitutes "FALSE" in the return value of the GetActiveJobs function, and the control returns to the call source (S1208, S1114 in FIG. 11). The language monitor 36 substitutes the return value of the GetActiveJobs function in lmRet (S1208, S1114 in FIG. 11).

Note that in this embodiment, a description of an error case in which "FALSE" is returned as the return value of the GetActiveJobs function will not be given. Details of the request issued by the PC 5 and the response returned by the printer 3 in response to the request in step S1114 are shown in FIGS. 14A and 14B.

The language monitor 36 acquires a value set in the <wprt: JobId> element 1402 in the GetActiveJobsResponse passed as the argument of the GetActiveJobs function (S1209, S1116 in FIG. 11). The language monitor 36 substitutes the acquired value in lmJobId (S1210, S1116 in FIG. 11), and the process advances to step S1211. In step S1211, the language monitor 36 returns lmRet as the return value of the LM_WritePort( ) function to the spooler 40, thus ending the processing of the LM_WritePort( ) function. Then, the control returns to the spooler 40 as a call source.

Figure 13:
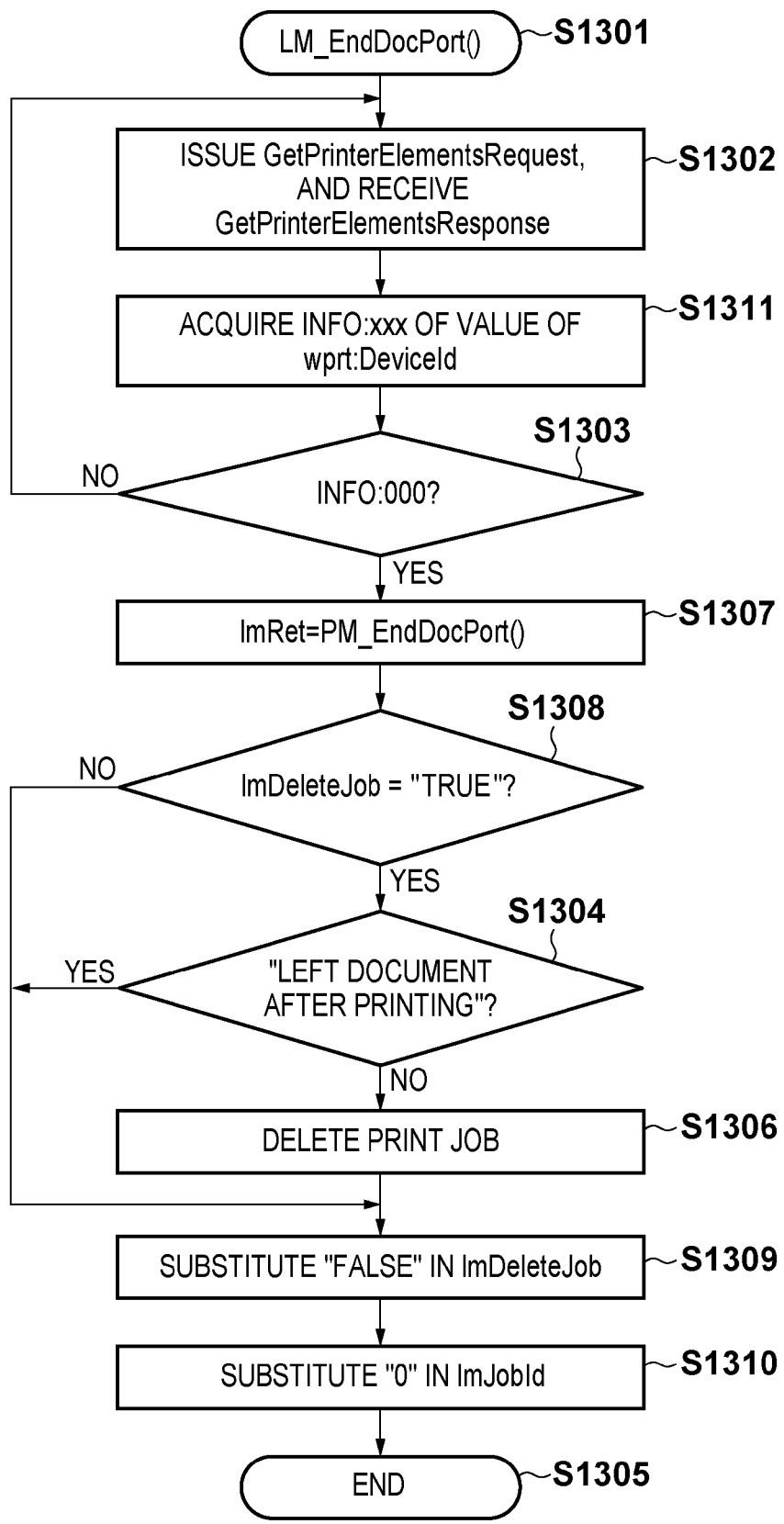
FIG. 13 is a flowchart showing processing of an LM_EndDocPort( ) function in the language monitor 36.

FIG. 13 is a flowchart showing the processing of the LM_EndDocPort( ) function in the language monitor 36. FIG. 13 is one of the drawings, which best illustrate characteristic features of the present invention. A program according to the sequence shown in FIG. 13 is stored in the HDD 202, is read out onto the RAM 201, and is executed by the CPU 204.

In a case in which the PC executes print processing by issuing a print job to the printer 3, when the PC has sent all print data of that print job to the printer 3, the spooler 40 calls the LM_EndDocPort( ) function. Then, the language monitor 36 starts the processing of this LM_EndDocPort( ) function.

When the spooler 40 calls the LM_EndDocPort( ) function in step S608 in FIG. 6, the language monitor 36 starts the processing of the LM_EndDocPort( ) function (S1301). The language monitor 36 calls the GetPrinterElements( ) function of the WSDAPIs required to control the WSD by setting wprt:PrinterDescription in its argument (S1302). In this function, the PC 5 issues a WSD print service request (GetPrinterElementsRequest) to the printer 3 (S1302, S610 in FIG. 6).

In response to this request, the printer 3 returns a response (GetPrinterElementsResponse) to the PC 5 (S1302, S611 in FIG. 6). Upon reception of this response, the PC 5 substitutes "TRUE" in the return value of the GetPrinterElements( ) function, and the control returns to the language monitor 36 as a call source (S1302, S610 in FIG. 6).

When the PC 5 does not receive any response within a predetermined time period since it issued the request to the printer 3, it substitutes "FALSE" in the return value of the GetPrinterElements( ) function. Then, the control returns to the language monitor 36 as a call source (S1302, S610 in FIG. 6). The language monitor 36 substitutes the return value of the GetPrinterElements( ) function in lmRet (S1302, S610 in FIG. 6).

Note that in this embodiment, a description of an error case in which "FALSE" is returned as the return value of the GetPrinterElements( ) function will not be given. Details of the request issued by the PC 5 and the response which is returned by the printer 3 in response to that request in step S1302 are shown in FIGS. 8A and 8B.

The language monitor 36 acquires a value set in the <wprt: DeviceId> element 804 in the response passed as the argument of the GetPrinterElements( ) function in step S1302. Then, the language monitor 36 acquires information INF:xxx (xxx assumes one of values "000" and "001") indicating a status of the printer 3 included in the acquired value (S1311). The language monitor 36 confirms INFO:xxx. If the language monitor 36 determines that INFO:xxx is "INFO:000" which represents that the printer 3 is online and in the standby state, the process advances to step S1307. If the language monitor 36 determines that INFO:xxx is not "INFO:000" (it is "INFO: 001"), the process returns to step S1302. In this case, when the printer 3 is online and in the standby state, this means that print processing is complete.

That is, the language monitor 36 follows up whether or not print processing in the printer 3 is complete, by repeating the series of processes in steps S1302, S1311, and S1303. After the print processing is complete, the process advances to step S1307.

In step S1307, the language monitor 36 calls the PM_EndDocPort( ) function of the port monitor 37, and substitutes the return value of that function in lmRet. The language monitor 36 confirms the value of lmDeleteJob. If lmDeleteJob=TRUE, the process advances to step S1304; otherwise (lmDeleteJob=FALSE), the process jumps to step S1309. In step S1304, the language monitor 36 confirms a setting value of the "leave document after printing" function of the printer queue 32. If the setting value is ON, the process jumps to step S1309; if the setting value is OFF, the process advances to step S1306.

In step S1306, the language monitor 36 deletes that print job from the printer queue 32. At this time, for example, using a SetJob( ) function provided by the OS, the language monitor 36 sets a value "JOB_CONTROL_RELEASE" in "Command" of a fifth argument of that function, and calls that function, thereby deleting the print job from the printer queue 32.

This is because the port monitor 37 uses the SetJob( ) function at the beginning of print processing, sets a value "JOB_CONTROL_RETAIN" in "Command" of the fifth argument of that function, and then calls that function.

```
BOOL SetJob(
    _in HANDLE hPrinter,
    _in DWORD JobId,
    _in DWORD Level,
    _in LPBYTE pJob,
    _in DWORD Command
);
```

Command [in]: The print job operation to perform. This parameter can be one of the following values.

JOB_CONTROL_RETAIN: Keep the job in the queue after it prints.

JOB_CONTROL_RELEASE: Release the print job.

JOB_CONTROL_RESTART: Restart the print job. A job can only be restarted if it was printing.

Note that values to be set in the first to fourth arguments upon using the SetJob( ) function include general information. Since this information is that described at the Microsoft Developer Network (MSDN) site, a description thereof will not be given.

In step S1309, the language monitor 36 initializes lmDeleteJob by substituting "FALSE" in it, and initializes lmJobId by substituting "0" in it (S1310). The language monitor 36 returns lmRet to the spooler 40 as the return value of the LM_EndDocPort( ) function, and ends the processing of the LM_EndDocPort( ) function. Then, the control returns to the spooler 40 as a call source (S1305).

If the "leave document after printing" function of the printer queue 32 is ON in step S1304, the language monitor 36 does not delete the print job from the printer queue 32. Thus, this function normally operates, and this print job is left in the printer queue 32 even after printing.

In this manner, in the case shown in FIGS. 10A and 10B, even when the printer 3 cannot return any print end event to the PC 5, the print-ended print job can be automatically deleted from the printer queue. Therefore, high user's operability is assured.

A case will be examined below wherein when the language monitor incorporates processing for deleting a given print job from the printer queue for all print jobs, the printer can return a print end event to the PC. In such case, the port monitor deletes that print-ended print queue from the printer queue in the JobEndStateEvent notification waiting process, and the language monitor also deletes that print job from the printer queue. For this reason, the print job which has already been deleted by either the port monitor or language monitor is to be deleted again. As a result, processing for deleting the print job which has already been deleted from the printer queue over again occurs, and this processing may cause unexpected malfunctions in the OS, thus posing a problem.

Hence, in this embodiment, in steps S1204 and S1205 in FIG. 12, the language monitor 36 acquires the <ans:EventControl> element 802 using the GetPrinterElements operation. Only when the acquired value is "false", the language monitor 36 substitutes "TRUE" in lmDeleteJob. Only when the value set in lmDeleteJob is "TRUE", a print job is deleted from the printer queue 32 in step S1306 in FIG. 13.

In this way, when the language monitor 36 executes control using the <ans:EventControl> element 802, the aforementioned problem can be prevented from occurring, thus implementing a secure peripheral apparatus control system free from any malfunctions in the OS.

In this example, after the port monitor 37 executes the CreatePrintJob operation in step S1202 in FIG. 12, that is, after a print job request is issued, the language monitor 36 executes the GetPrinterElements operation in step S1204. Then, the language monitor 36 acquires the <ans:EventControl> element 802. The reason for such operations will be described below.

The language monitor 36 also acquires a Device ID shown in FIG. 8B by the GetPrinterElements operation in step S1204. After the first print control command included in the print job issued by the CreatePrintJob operation is sent from the PC 5, the language monitor 36 confirms whether or not two-way communications can be made with the printer 3. For this purpose, the language monitor 36 attempts to acquire a Device ID, thereby discriminating whether or not data sent from the printer 3 can be received.

In step S1204, the language monitor 36 issues the GetPrinterElements operations so as to acquire the Device ID in the same manner as in the related art. In this embodiment, using this GetPrinterElements operation in step S1204, the Device ID and <ans:EventControl> element 802 are simultaneously acquired. Thus, the chance of issuance of the GetPrinterElements operation by the language monitor 36 for the purpose of acquiring only the <ans:EventControl> element 802 is never increased. Furthermore, traffics on the network 4 can be suppressed to minimum required traffics, thus preventing the PCs and devices on the network 4 from being adversely influenced.

Note that when the language monitor 36 need not confirm whether or not two-way communications can be made, the present invention is not limited to this example. In such case, before the port monitor 37 executes the CreatePrintJob operation, that is, before it issues a print job request, the language monitor 36 executes the GetPrinterElements operation. Then, the language monitor 36 acquires the <ans:EventControl> element 802 in advance. In this way, this embodiment can also be implemented, thus obtaining the same effects.

In this case, the confirmation processing of the setting value of the "leave document after printing" function of the printer queue 32, which is executed by the language monitor 36, may be executed before execution of the aforementioned GetPrinterElements operation. This confirmation processing corresponds to step S1304 in FIG. 13 or step S1504, which will be described later using FIG. 15. In this case, only when the setting value of the "leave document after printing" function is OFF, the language monitor 36 can execute the GetPrinterElements operation so as to acquire the <ans:EventControl> element 802.

In this way, an unnecessary GetPrinterElements operation can be prevented from being executed. As a result, an unnecessary request (GetPrinterElementsRequest) and response (GetPrinterElementsResponse) can be prevented from being exchanged, thus preventing an increase in traffic on the network 4.

Figure 20:
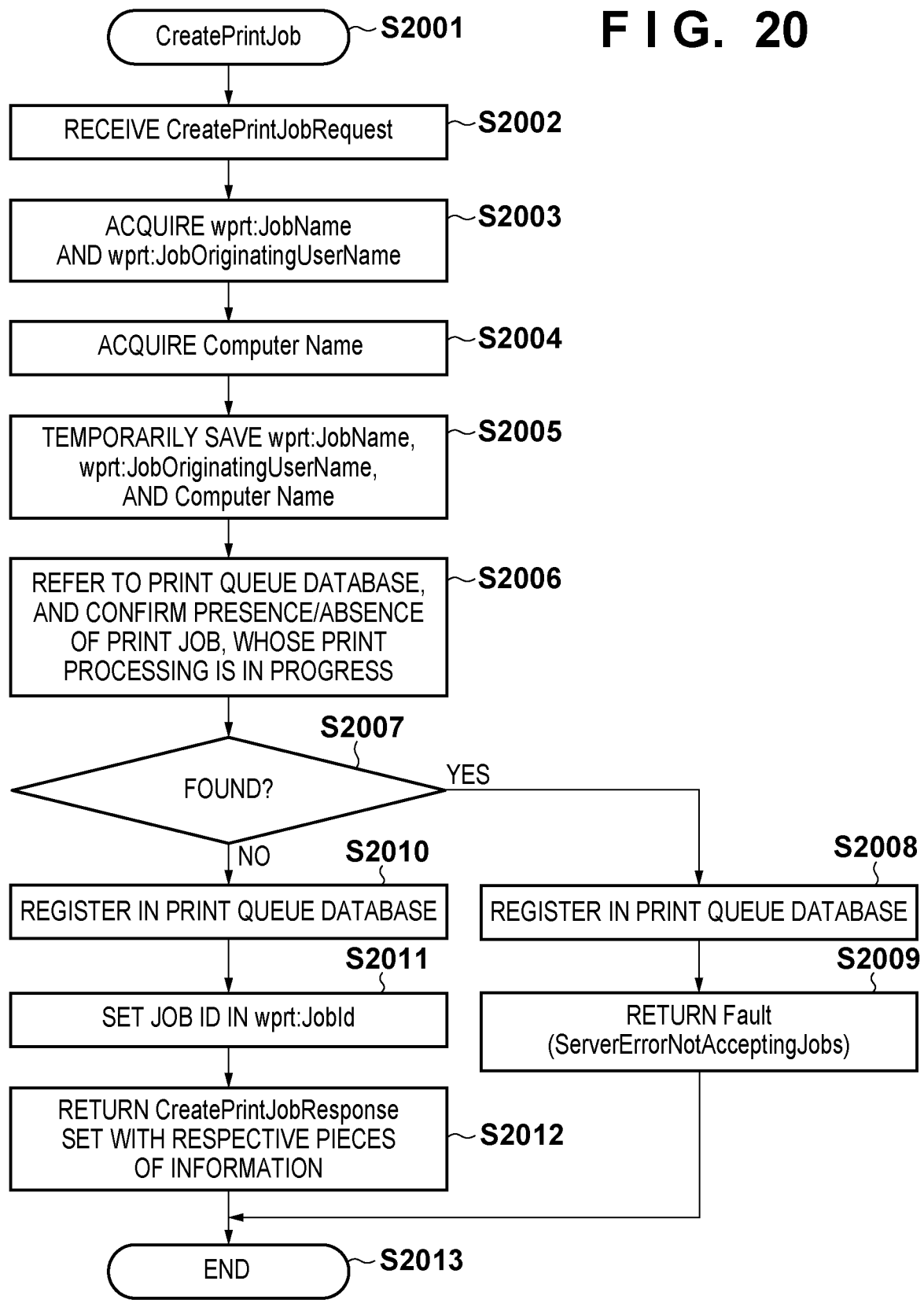
FIG. 20 is a flowchart showing CreatePrintJob processing in a printer 3.

FIG. 20 is a flowchart showing the CreatePrintJob processing in the printer 3. A program according to the sequence of FIG. 20 is stored in the ROM 16, is read out onto the RAM 17, and is executed by the CPU 15.

When the PC (PC 5) issues the CreatePrintJobRequest (for example, the request shown in FIG. 19A) to the printer 3 in step S1106 in FIG. 11, step S2001 is started. The printer 3 receives this request (S2002). Next, the printer 3 acquires a print job name set in the <wprt:JobName> element 1902 and a user name set in the <wprt:JobOriginatingUserName> element 1903 (S2003). Next, the printer 3 acquires a computer name (Computer Name) of the PC 5 (S2004). In this embodiment, the printer 3 acquires an IP address from a TCP reception socket at an HTTP POST addressed to a WSD print service, and acquires the computer name based on this IP address.

Note that respective processes are executed by acquiring the computer name from the IP address, and specifying the PC (PC 5) using this computer name, for the sake of simplicity. Alternatively, respective processes may be executed by specifying the PC 5 using the IP address.

The printer 3 temporarily saves the acquired print job name, user name, and computer name (S2005). Then, the printer 3 confirms the presence/absence of a print job request whose print processing is in progress with reference the print queue database 124 shown in FIGS. 10B and 10C (S2006). If it is determined that there is a print job request whose print processing is in progress, the process advances to step S2008; otherwise, the process advances to step S2010 (S2007). In step S2008, the printer 3 assigns a job ID to the print job request requested from the PC (PC 5), and registers this print job request in the print queue database 124 to have a Status "Not Accepted". Then, the printer 3 returns Fault (ServerErrorNotAcceptingJobs) which indicates that the print job request cannot be accepted to the PC 5 (S2009), thus ending this processing (S2013).

In step S2010, the printer 3 assigns a job ID to the print job request requested from the PC 5, and registers this print job request in the print queue database 124 to have a Status "Processing". Then, the printer 3 sets the job ID in the <wprt:JobId> element 1904 (S2011). Next, the printer 3 prepares a response (CreatePrintJobResponse) indicating that this print job is accepted and processed, for example, that shown in FIG. 19B. The printer 3 sets the <wprt:JobId> element 1904 set in step S2011 and various other kinds of information in the response, and returns the response to the PC 5 (S2012), thus ending this processing (S2013).

Figure 9:
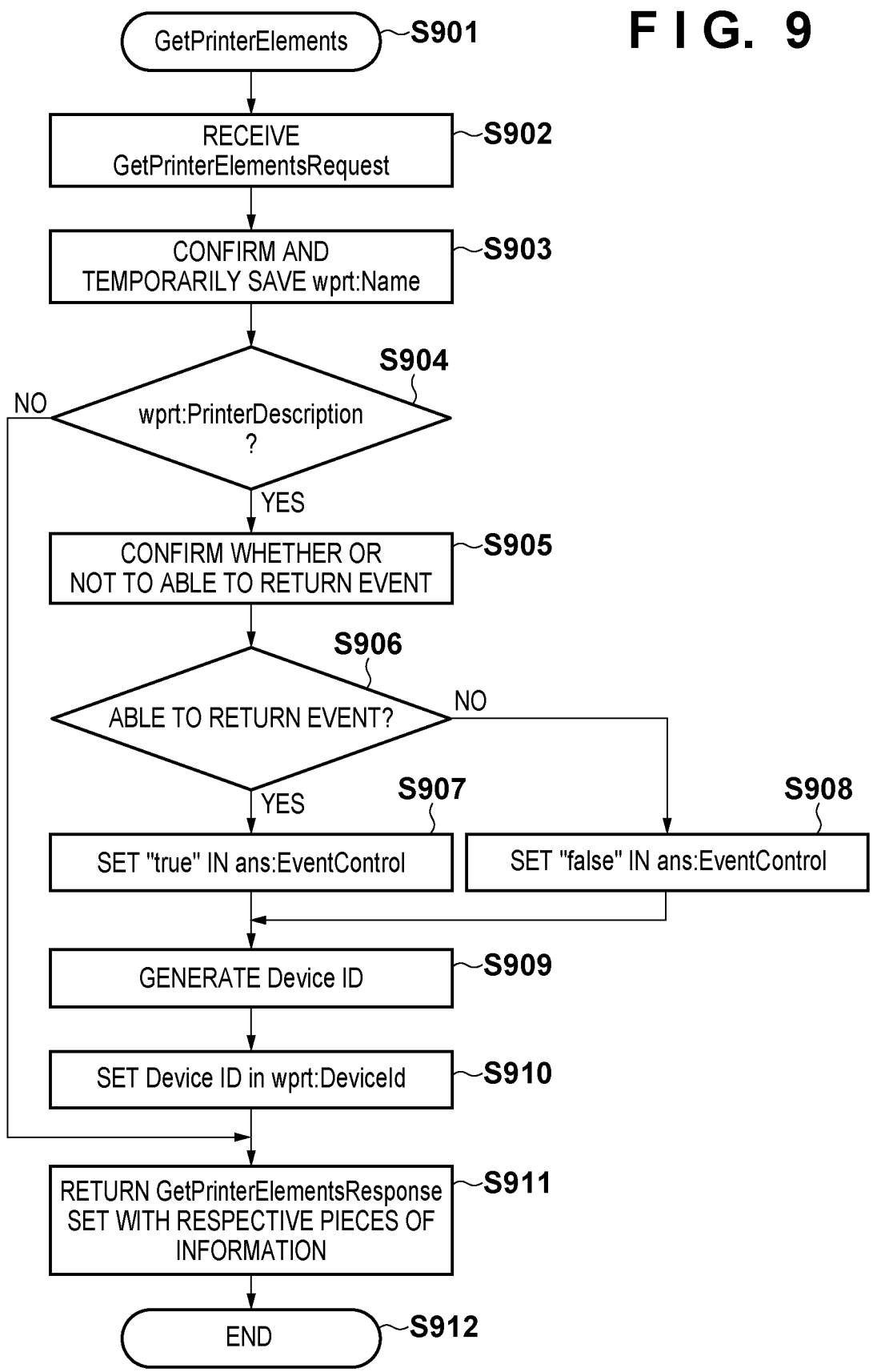
FIG. 9 is a flowchart showing GetPrinterElements processing in a printer 3.

FIG. 9 is a flowchart showing the GetPrinterElements processing in the printer 3. FIG. 9 is one of the drawings, which best illustrate characteristic features of the present invention.

A program according to the sequence of FIG. 9 is stored in the ROM 16, is read out onto the RAM 17, and is executed by the CPU 15.

When the PC issues the GetPrinterElementsRequest to the printer 3, the printer 3 executes the processing shown in FIG. 9 in response to this request. A most desirable issuance timing of this request in the present invention corresponds to a timing when the PC has sent all print data of a given print job to the printer 3. Note that, for example, this processing may be executed at other timings such as a print start timing of that print job or during print processing of the print job.

When the PC 5 issues the request (GetPrinterElementsRequest) to the printer 3 in step S1204 in FIG. 12, for example, when the request shown in FIG. 8A is issued, and step S901 is started. The printer 3 receives the request (S902). Then, the printer 3 confirms a value set in a <wprt:Name> element (for example, the element 801) from this request, and temporarily saves that value (S903). If the request includes a plurality of <wprt:Name> elements, the printer 3 temporarily saves values set in all the elements.

Next, if the printer 3 finds wprt:PrinterDescription as the value set in the <wprt:Name> element, the process advances to step S905; otherwise, the process jumps to step S911 (S904). The printer 3 confirms in step S905 with reference to the event management database 123 shown in FIG. 10A whether or not a WSD event can be returned to the PC as a request source. As a result, if a WSD event can be returned to the PC 5, the process advances to step S907; otherwise, the process advances to step S908 (S906).

In step S907, the printer 3 sets "true" in the <ans:EventControl> element 802, and the process advances to step S909. In step S908, the printer 3 sets "false" in the <ans:EventControl> element 802, and the process advances to step S909. In step S909, the printer 3 generates a Device ID. At this time, the printer 3 confirms a status of itself, and sets a value according to the status at that time in information INFO which is included in the Device ID and represents the status of itself. In this case, "000" which represents that the printer is online and in a standby state or "001" which represents that print processing is in progress (Processing) is set.

Next, the printer 3 sets the Device ID generated in step S909 in the <wprt:DeviceId> element 804, and the process advances to step S911 (S910). In step S911, the printer 3 returns a response (GetPrinterElementsResponse) in which respective pieces of information are set in steps S907, S908, and S910, to the PC 5 as a response to the request received in step S902. Then, the printer 3 ends this processing (S912).

Figure 21:
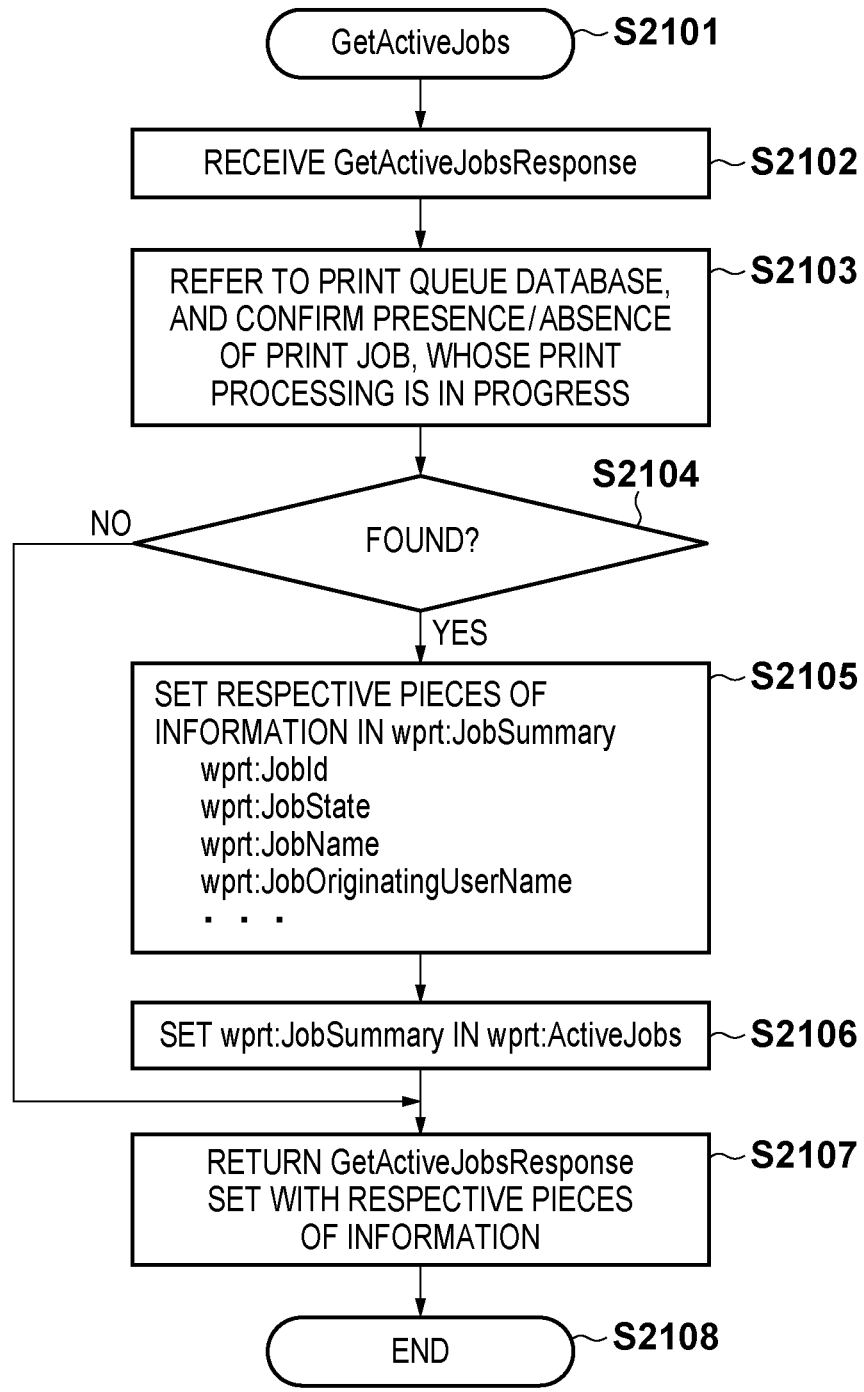
FIG. 21 is a flowchart showing GetActiveJobs processing in a printer 3.

FIG. 21 is a flowchart showing the GetActiveJobs processing in the printer 3. A program according to the sequence of FIG. 21 is stored in the ROM 16, is read out onto the RAM 17, and is executed by the CPU 15.

Figure 16:
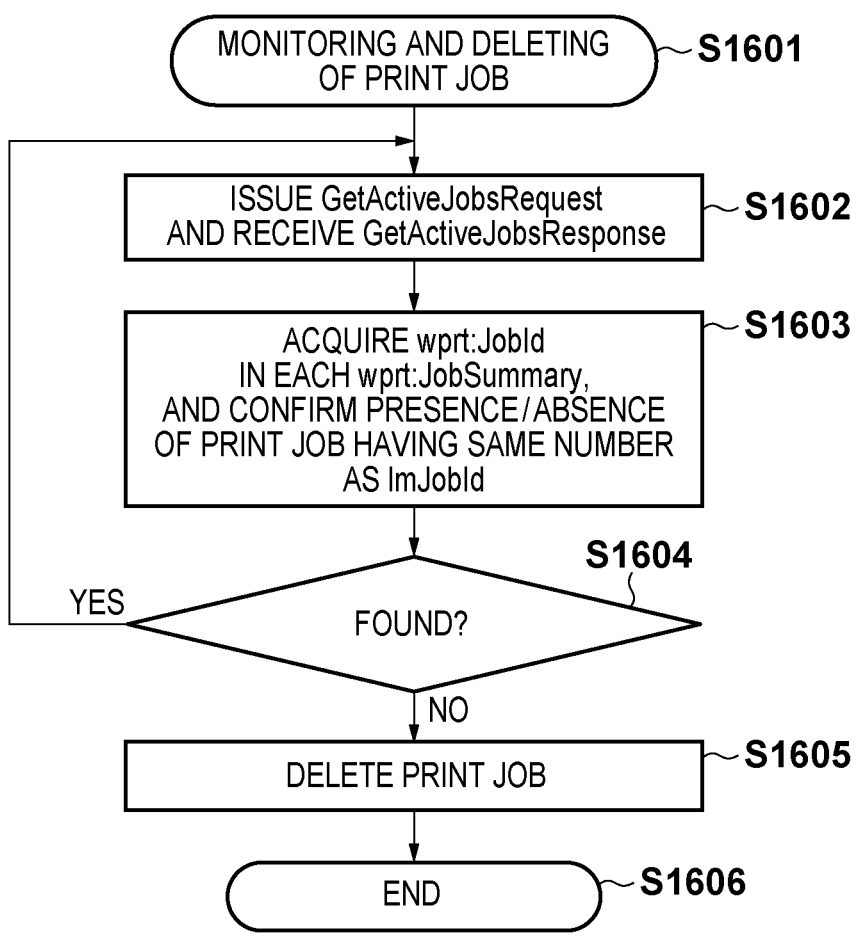
FIG. 16 is a flowchart showing processing for monitoring and deleting a print job in the language monitor.

The PC 5 issues the request (GetActiveJobsRequest), for example, that shown in FIG. 14A, to the printer 3 in step S1208 in FIG. 12 or step S1602 in FIG. 16, and step S2101 is started. The printer 3 receives this request (S2102), and then confirms the presence/absence of a print job request whose print processing is in progress with reference to the print queue database 124 shown in FIGS. 10B and 10C (S2103). If it is determined that there is a print job request whose print processing is in progress, the process advances to step S2105; otherwise, the process jumps to step S2107 (S2104). In step S2105, the printer 3 sets following pieces of information associated with the print job request whose print processing is in progress in the <wprt:JobSummary> element 1401.

<wprt:JobId> element 1402
<wprt:JobState> element 1404
<wprt:JobName> element 1405
<wprt:JobOriginatingUserName> element 1406

For example, when the printer 3 includes a print queue which can simultaneously accept and process a plurality of print job requests, and print processes of these print job requests are in progress at the same time, the printer 3 prepares for <wprt:JobSummary> elements for all these print job requests. Then, the printer 3 sets, in these elements, respective pieces of information associated with each of these print job requests.

The printer 3 sets the <wprt:JobSummary> element 1401 prepared in step S2105 in the <wprt:ActiveJobs> element 1403 (S2106). In step S2107, the printer 3 returns a response (GetActiveJobsResponse) in which the <wprt:ActiveJobs> element 1403 set in step S2106 and other kinds of information are set to the PC 5 as a response to the request. Then, the printer 3 ends this processing (S2108).

The peripheral apparatus control system described in the first embodiment supports paper jam error recovery processing, which recovers a jam of a recording sheet during print processing, and re-prints from a page where the jam has occurred, and the print processing has failed.

Details of this paper jam error recovery processing are as follows. The language monitor 36 periodically acquires a page number, which is being printed, and error presence/absence information from the printer 3 during print processing of a certain print job at time intervals of, for example, once per 5 sec. Then, the language monitor 36 saves the acquired information in a print control structure (not shown; physically corresponding to the RAM 201) required to save print control-related information. When a jam of a recording sheet has occurred, the language monitor 36 acquires paper jam error information from the printer 3, and saves that paper jam error information in the print control structure.

In this state, the print control structure saves the paper jam error information and a page number where the paper jam error has occurred. In the LM_WritePort( ) function, the language monitor 36 uses the SetJob( ) function, and sets a value "JOB_CONTROL_RESTART" in "Command" in its fifth argument. Then, in order to restart the print job, the language monitor 36 calls this function, and then ends the LM_WritePort( ) function. Then, the process returns to the spooler 40 as a call source.

The spooler 40 generates a new print job required to re-print the print job, stacks the new print job in the print queue 32, and calls the LM_EndDocPort( ) function of the language monitor 36. The language monitor 36 executes the processing of the LM_EndDocPort( ) function shown in FIG. 13, and sends a reset command to the printer 3 at a timing between steps S1301 and S1302. After that, the language monitor 36 executes processes in step S1302 and subsequent steps, and the process returns to the spooler 40 as a call source.

Upon reception of the reset command, the printer 3 discards the remaining print data, which are temporarily stored in the RAM 17, of the print job that has caused the paper jam error, and releases the error status. At this time, the printer 3 sets "000" which indicates that the printer is online and in a standby state in information INFO: which is included in a Device ID and represents a status of the printer 3. The spooler 40 ends the print job which has caused the paper jam error, and starts the new print job for re-printing.

In the LM_WritePort( ) function, the language monitor 36 receives print data of the new pint job for re-printing, and then refers to the print control structure. In this case, when the paper jam error information is set, the language monitor 36 refers to the page number where the paper jam error has occurred, and discards print data up to pages before that page number without sending them to the printer 3. Then, the language monitor 36 sends print data of the page where the paper jam error has occurred, and subsequent pages to the printer 3.

The printer 3 executes print processing according to the print data, and re-prints from the page where the paper jam error has occurred. During the paper jam error recovery processing, the language monitor 36 executes the processing of the LM_EndDocPort( ) function, and when the printer 3 cannot notify any print end event, the language monitor 36 deletes the print job which has caused the paper jam error from the printer queue 32 in step S1306.

In this manner, during the paper jam error recovery processing, the language monitor 36 deletes the print job whose print processing has failed due to the paper jam error from the printer queue 32 in step S1306. In this manner, the print job whose print processing has failed due to the paper jam error can be prevented from being left in the printer queue 32 to have a Status "Sent to printer", thus implementing the peripheral apparatus control system with excellent operability.

This embodiment has exemplified the printer 3 as an example of a peripheral apparatus, but the present invention is also effective to a multi-function printer (MFP) which includes a printer, FAX, scanner, storage, and the like. In case of the MFP which incorporates the WSD, the following WSD Services can be respectively assigned to the printer, FAX, and scanner functions.

| Function | WSD service | Remarks |
| --- | --- | --- |
| Printer | Print service | for printer function |
| FAX | Print service | for FAX function |
| Scanner | Scan service | |

In this case, "ServiceId" data assigned to the services of the respective functions are as follows.

```
Printer: <wsdp:ServiceId>
http://schemas.abc.xxx/Printer</wsdp:ServiceId>
FAX: <wsdp:ServiceId>
http://schemas.abc.xxx/Fax</wsdp:ServiceId>
Scanner: <wsdp:ServiceId>
http://schemas.abc.xxx/Scanner</wsdp:ServiceId>
```

To both the printer and FAX functions, the print service is assigned, and the "ServiceId" data are different for the printer and FAX functions. For this reason, "ServiceType" data of both the printer and FAX functions are "PrinterServiceType".

As described above, the language monitor 36 issues the GetPrinterElementsRequest from the PC 5 to the printer 3 using the GetPrinterElements( ) function of the WSDAPIs. Then, the language monitor 36 can receive the GetPrinterElementsResponse which is returned from the printer 3 to the PC 5. At this time, the GetPrinterElements operation can be used by designating "ServiceType" data in the GetPrinterElements( ) function as follows, and then calling this function.

```
<portType name="PrinterServiceType"
    wse:EventSource="true">
  <operation name="GetPrinterElements">
    <input message="wprt:GetPrinterElementsRequestMsg"
        wsa:Action="http://schemas.yyyy.xxx/YYYY/
        MM/wdp/print/GetPrinterElements" />
    <output message="wprt:GetPrinterElementsResponseMsg"
        wsa:Action="http://schemas.yyyy.xxx/YYYY/MM/
        wdp/print/GetPrinterElementsResponse" />
  </operation>
</portType>
```

However, in case of the MFP, the "ServiceType" data of both the printer and FAX functions indicate the same type, that is, "PrinterServiceType". For this reason, we confront the following problem. That is, even when the aforementioned function is called by designating "ServiceType", information associated with the printer or FAX function cannot be acquired while distinguishing the printer and FAX functions from each other. Hence, in case of the MFP, the language monitor 36 calls the function by designating "ServiceID" to designate the printer or FAX function, and can acquire information associated with the designated function using the GetPrinterElements operation. Thus, even for the MFP which includes the printer and FAX functions, the peripheral apparatus control system which can prevent malfunctions and allows accurate control can be implemented.

Second Embodiment

The first embodiment has exemplified the case in which a printer 3 cannot simultaneously accept and process a plurality of print jobs, but it can accept and process only one print job. The second embodiment will explain a method in which a language monitor 36 follows up whether or not print processing, in the printer 3, of a print job issued (sent) by itself is complete, and deletes that print job from a printer queue 32 as needed.

However, for example, when the printer 3 includes a print queue that can simultaneously accept and process a plurality of print job requests, a print job issued (sent) by the language monitor 36 is not always immediately printed in the printer 3. For example, there is a case in which that print job is merely stacked in a print queue in the printer 3, and its print processing is not started.

In this case, the following example will be examined. That is, when the printer 3 can simultaneously accept and process 10 print jobs, a PC 1 issues a print request of a print job 144, and a PC 5 simultaneously issues a plurality of print requests while the printer 3 executes print processing of the print job request issued from the PC 1. Then, a plurality of print jobs are stacked in the printer queue 32 in the PC 5.

In the PC 5, when a spooler 40 starts print processing of a first print job 145 stacked in the printer queue 32, the PC 5 issues a print job request of this print job 145 to the printer 3. Since the printer 3 has accepted the print job request issued from the PC 1 and is executing its print processing, it stores print data sent from the PC 5 in the print queue in itself, but cannot start print processing of the print job request issued from the PC 5.

When the PC 5 (language monitor 36) has sent all print data of the print job 145 to the printer 3, the language monitor 36 repeats steps S1302, S1311, and S1303 in FIG. 13. Then, the language monitor 36 confirms (follows up) whether or not print processing of the print job 145 in the printer 3 is complete. However, the language monitor 36 monitors a print status of the print job 145 whose print processing has not been started yet in the printer 3, and follows up until that print processing is complete. For this reason, the language monitor 36 cannot return the control to the spooler 40, and the PC 5 (spooler 40) cannot issue the next print job (not shown). A solution to such problem will be described below with reference to FIGS. 15 and 16.

Figure 15:
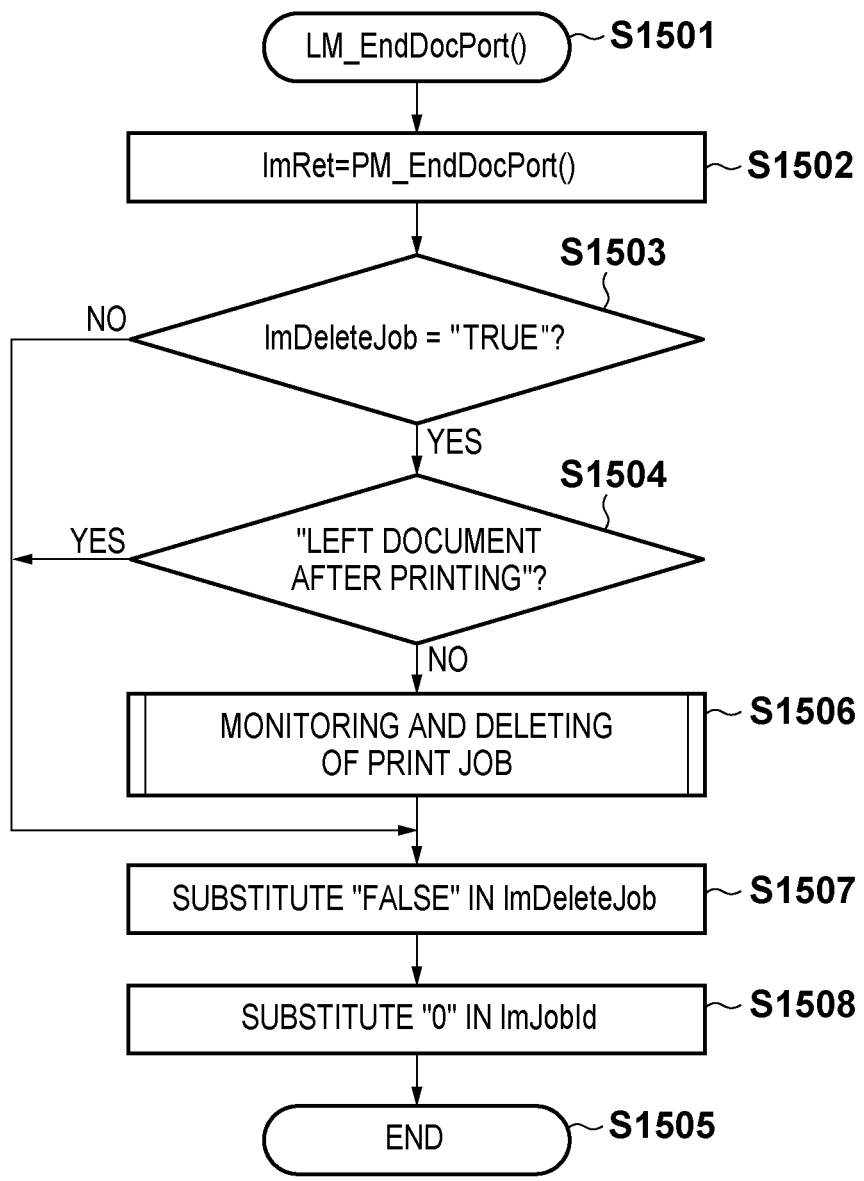
FIG. 15 is a flowchart showing processing of the LM_EndDocPort( ) function in the language monitor.

FIG. 15 is a flowchart showing the processing of an LM_EndDocPort( ) function in the language monitor 36. FIG. 15 is one of the drawings, which best illustrate characteristic features of the present invention. A program according to the sequence shown in FIG. 15 is stored in an HDD 202, is read out onto a RAM 201, and is executed by a CPU 204.

In a case in which the PC issues a print job to the printer 3 to execute print processing, after the PC sends all print data of that print job to the printer 3, the spooler 40 calls the LM_EndDocPort( ) function. Then, the language monitor 36 starts processing of this LM_EndDocPort( ) function.

When the spooler 40 calls the LM_EndDocPort( ) function of the language monitor 36 in step S608 in FIG. 6, the language monitor 36 starts the processing of this function in FIG. 15 (S1501). The language monitor 36 calls a PM_EndDocPort( ) function of a port monitor 37, and substitutes a return value of that function in lmRet (S1502). The language monitor 36 confirms a value of lmDeleteJob. If lmDeleteJob=TRUE, the process advances to step S1504; otherwise (lmDeleteJob=FALSE), the process jumps to step S1507 (S1503).

In step S1504, the language monitor 36 confirms a setting value of a "leave document after printing" function of the printer queue 32. If the setting value is ON, the process jumps to step S1507; if the setting value is OFF, the process advances to step S1506. In step S1506, the language monitor 36 launches an independent process, and executes processing for monitoring and deleting a print job shown in FIG. 16 in that process.

In step S1507, the language monitor 36 initializes lmDeleteJob by substituting "FALSE" in it, and also initializes lmJobId by substituting "0" in it (S1508). The language monitor 36 returns lmRet to the spooler 40 as a return value of the LM_EndDocPort( ) function, and ends the processing of the LM_EndDocPort( ) function. Then, the control returns to the spooler 40 as a call source (S1505).

FIG. 16 is a flowchart showing the processing for monitoring and deleting a print job in the language monitor 36. FIG. 16 is one of the drawings, which best illustrate characteristic features of the present invention. A program according to the sequence shown in FIG. 16 is stored in the HDD 202, is read out onto the RAM 201, and is executed by the CPU 204.

When the language monitor 36 executes the processing for monitoring and deleting a print job by launching the independent process in step S1506 in FIG. 15, it starts the processing for monitoring and deleting a print job in FIG. 16 (S1601). The language monitor 36 calls a GetActiveJobs function of WSDAPIs required to control the WSD (S1602). In this function, the PC 5 issues a WSD print service request (GetActiveJobsRequest) to the printer 3. In response to this request, the printer 3 returns a response (GetActiveJobsResponse) to the PC 5 (S1602). Upon reception of the response, the PC 5 substitutes "TRUE" in a return value of the GetActiveJobs function, and the control returns to the call source (S1602).

When the PC 5 does not receive any response within a predetermined time period after it issued the request to the printer 3, it substitutes "FALSE" in the return value of the GetActiveJobs function, and the control returns to the call source (S1602). In step S1602, the language monitor 36 substitutes the return value of the GetActiveJobs function in lmRet. Note that in this embodiment, a description of an error case in which "FALSE" is returned as the return value of the GetActiveJobs function will not be given.

Details of the request issued by the PC and the response returned by the printer 3 in response to the request in step S1602 will be described using FIGS. 14A and 14B. The language monitor 36 acquires pieces of information set in respective <wprt:JobSummary> elements in a <wprt:ActiveJobs> element 1403 in the response passed as an argument of the GetActiveJobs function in step S1602 (S1603). Then, the language monitor 36 acquires values set in <wprt:JobId> elements in the respective <wprt:JobSummary> elements, and confirms the presence/absence of a print job which has the same number as in lmJobId, and whose print processing is in progress (S1603). If the language monitor 36 determines that the same value as in lmJobId is found in the <wprt:JobId> elements included in the respective <wprt:JobSummary> elements in the <wprt:ActiveJobs> element 1403, the process returns to step S1602.

If the language monitor 36 determines that the same value is not found, the process advances to step S1605, and the language monitor 36 deletes the print job of the job ID set in lmJobId from the printer queue 32. Then, the language monitor 36 ends the processing for monitoring and deleting a print job, thus ending this process accordingly (S1606).

In step S1506 in FIG. 15, the language monitor 36 executes the processing for monitoring and deleting a print job by launching the independent process. Thus, the processes in steps S1507, S1508, and S1505 in FIG. 15 are executed without waiting for completion of the processing for monitoring and deleting a print job shown in FIG. 16, and the control can return to the spooler 40 as a call source.

Hence, even when the printer 3 includes the print queue that can simultaneously accept and process a plurality of print job requests, the print job can be processed without being influenced by print processing statuses of other print job requests in the printer 3. That is, the PC 5 (spooler 40) can sequentially issue a plurality of print jobs stacked in the printer queue 32 to the printer 3.

Furthermore, in a case shown in FIG. 10A, even when the printer 3 cannot return a print end event (JobEndStateEvent) to the PC 5, a print-ended print job (print job 145) can be deleted. That is, as shown in FIG. 18E, the print-ended print job can be automatically deleted from the printer queue 32 in the PC 5, thus assuring excellent user's operability.

Note that the case has been exemplified wherein the language monitor 36 executes the processing for monitoring and deleting a print job by launching the independent process in step S1506 in FIG. 15. However, the present invention is not limited to such specific example. For example, the present invention can also be implemented by executing the processing for monitoring and deleting a print job shown in FIG. 16 by a status monitor 39, which is already running in another process, thus obtaining the same effects.

Alternatively, for example, a printer management application (not shown), which displays states of a plurality of printers on a network 4 and statuses of print jobs, and allows the user to manipulate the printers and print jobs, executes the processing for monitoring and deleting a print job shown in FIG. 16. Thus, the present invention can also be implemented, and the same effects can be obtained.

The second embodiment has explained the example in which the printer 3 actually processes a print job, and at the time of completion of print processing, that print job is deleted from the printer queue 32 (first example). In addition to this example, the present invention is applicable.

When the PC 5 sends all print data of a certain print job to the printer 3, and the printer 3 receives all these print data, that print job may be deleted from the printer queue 32 (second example). That is, when the Status of that print job changes to "Sent to printer", that print job is deleted from the printer queue 32. In this example, in a case in which a PC 1 issues a print job to the printer 3, the printer 3 notifies the PC 1 of a print end event when it receives all print data of that print job.

In the PC 1, upon reception of this event, the port monitor deletes that print job from the printer queue. In a case in which the PC 5 issues a print job to the printer 3, the printer 3 cannot notify the PC 5 of a print end event when it receives all print data of that print job. For this reason, the language monitor executes the processing for monitoring and deleting a print job using the GetActiveJobs operation shown in FIG. 16, thereby deleting that print job from the printer queue 32.

However, in FIG. 16, the language monitor 36 confirms the presence/absence of that print job in step S1604, and deletes the print job from the printer queue 32 in step S1605 if that print job is not found. Alternatively, the language monitor 36 executes the following processing.

If the print job is found, the language monitor 36 confirms whether or not "JobState" of that print job is "Pending", and "JobStateReason" is "JobIncoming". As a result of confirmation, if YES is determined, the process advances to step S1605, and the language monitor 36 deletes that print job from the printer queue 32. Otherwise, the process returns to step S1602. In this manner, a plurality of examples of the method of controlling the language monitor 36 to delete a print job from the printer queue 32 are available depending on the types of printers 3 and peripheral apparatus control systems.

The first example described in the second embodiment is most popular. The second example described in the second embodiment has an effect of allowing the user to easily view displayed contents of the printer queue in the PC in a case in which the printer 3 has a high processing performance and reliability, that is, nearly no print failure occurs or nearly no time is spent for printing.

Now, a case will be examined below wherein a printer which can accept and process only one print job, as described in the first embodiment, and a printer which can simultaneously accept and process a plurality of print job requests, as described in the second embodiment, are controlled by one printer driver 50.

After step S606 in FIG. 6, the language monitor 36 initializes lmMultipleJobs by substituting "FALSE" in it in an LM_StartDocPort( ) function. Also, after step S616 in FIG. 6, the language monitor 36 initializes lmMultipleJobs by substituting "FALSE" in it in the LM_EndDocPort( ) function. This lmMultipleJobs is a flag used in the language monitor 36, and is set with "FALSE" when the printer 3 is a printer which can accept and process only one print job. When the printer 3 is a printer which can simultaneously accept and process a plurality of print job requests, lmMultipleJobs is set with "TRUE".

In steps S1204 and S1205, the language monitor 36 calls a GetPrinterElements( ) function of the WSDAPIs required to control the WSD by setting wprt:PrinterDescription in its argument. Then, the language monitor 36 acquires a value set in an <ans:EventControl> element 802. At this time, the language monitor 36 also acquires a value set in an <ans:MultipleJobsControl> element 807. If this value is "true", the language monitor 36 sets "TRUE" in lmMultipleJobs.

Assume that step S1301 in FIG. 13 and step S1501 in FIG. 15 are identical function pointers. In step S609 in FIG. 6, the language monitor 36 confirms the value set in lmMultipleJobs immediately after it starts the processing of the LM_EndDocPort( ) function (before step S610). If lmMultipleJobs=FALSE, the process advances to step S1302 in FIG. 13; if lmMultipleJobs=TRUE, the process advances to step S1502 in FIG. 15.

In this manner, the printer driver 50 can automatically discriminate and control the printer described in the first embodiment and that described in the second embodiment, thus implementing the first and second embodiments of the present invention.

Third Embodiment

As described in the first embodiment, control of events of which a printer notifies a PC is generally seriously influenced by limitations of hardware resources of that printer. A practical example will be described below. For example, in an example shown in FIG. 10A of the first embodiment, a printer 3 can notify PCs 1 and 2 of events, but cannot notify a PC 5 of any event.

The third embodiment will explain an example, which can solve this problem and can also achieve the object of the present invention, with reference to FIG. 10D and FIGS. 17A and 17B. FIG. 10D shows an event management database used to manage WSD events of which the printer 3 notifies the PCs. FIG. 10D is one of the drawings, which best illustrate characteristic features of the present invention.

The third embodiment proposes a method of increasing the number of PCs, to which the printer can notify events, by limiting the number of events to be notified to the PCs. An event management database 125 shown in FIG. 10D is configured as follows.

A Subscribed Event column saves registration requests of respective WSD events issued from the PCs. A next ans:EventControl2 column saves information which represents whether or not the printer 3 permits registration of the registration requests of the respective events. In this column, "true" represents that the registration request of that event is permitted, and "false" represents that the registration request of that event is refused. Also, FIG. 10D shows an example in which the printer 3 notifies the PCs of only the following two out of six events defined in the WSD print services, and does not notify the PCs of the remaining four events.

JobStatusEvent (an event which represents a processing status)

JobEndStateEvent (an event which represents that print processing is complete).

These two events are used when a spooler controls print jobs in a printer queue in each PC. This example shows a state in which the printer 3 can notify the PCs 1, 2, and 5 of two events. Therefore, in response to a print job request from the PC 5 of a management number (No.) 1, as shown in FIG. 10B, the printer 3 can notify the PC 5 of an event representing its processing status, and a print end event.

FIG. 17A shows the contents of a GetPrinterElementsRequest, and FIG. 17B shows the contents of a GetPrinterElementsResponse. FIGS. 17A and 17B are ones of the drawings, which best illustrate characteristics features of the present invention. In FIGS. 17A and 17B, a description about elements 801, 806, 803, 805, and 804, which have already been described using FIGS. 8A and 8B, will not be repeated.

FIG. 17A shows an example of a request which is issued by the PC 5 to the printer 3. An <ans:EventControl2> element 1701 is private information. This information includes information representing whether or not the printer 3 can notify the PC of respective events defined by the WSD Print Service Definition Version 1.0.

In an <ans:PrinterElementsChangeEvent> element 1702, a value is set as follows. When the printer 3 can notify the PC of a PrinterElementsChangeEvent, "true" is set. When the printer 3 cannot notify the PC of this event, "false" is set. This example represents a state in which "false" is set, and the printer 3 cannot notify that PC of this event.

In an <ans:PrinterStatusSummaryEvent> element 1703, a value is set as follows. When the printer 3 can notify the PC of a PrinterStatusSummaryEvent event, "true" is set. When the printer 3 cannot notify the PC of that event, "false" is set. This example represents a state in which "false" is set, and the printer 3 cannot notify that PC of this event.

In an <ans:PrinterStatusConditionEvent> element 1704, a value is set as follows. When the printer 3 can notify the PC of a PrinterStatusConditionEvent, "true" is set. When the printer 3 cannot notify the PC of that event, "false" is set. This example represents a state in which "false" is set, and the printer 3 cannot notify that PC of this event.

In an <ans:PrinterStatusConditionClearedEvent> element 1705, a value is set as follows. When the printer 3 can notify the PC of a PrinterStatusConditionClearedEvent, "true" is set. When the printer 3 cannot notify the PC of that event, "false" is set. This example represents a state in which "false" is set, and the printer 3 cannot notify that PC of this event.

In an <ans:JobStatusEvent> element 1706, a value is set as follows. When the printer 3 can notify the PC of a JobStatusEvent event, "true" is set. When the printer 3 cannot notify the PC of that event, "false" is set. This example represents a state in which "true" is set, and the printer 3 can notify that PC of this event.

In an <ans:JobEndStateEvent> element 1707, a value is set as follows. When the printer 3 can notify the PC of a JobEndStateEvent, "true" is set. When the printer 3 cannot notify the PC of that event, "false" is set. This example represents a state in which "true" is set, and the printer 3 can notify that PC of this event.

The third embodiment achieves the object of the present invention using the <ans:JobEndStateEvent> element 1707 in place of an <ans:EventControl> element 802 of the first embodiment.

In steps S907 and S908 in FIG. 9, the <ans:JobEndStateEvent> element 1707 is used in place of the <ans:EventControl> element 802. In steps S1110 and S1112 in FIG. 11, the <ans:JobEndStateEvent> element 1707 is used in place of the <ans:EventControl> element 802. In steps S1205 and S1206 in FIG. 12, the <ans:JobEndStateEvent> element 1707 is used in place of the <ans:EventControl> element 802.

As described above, in the case shown in FIG. 10D, even when the printer 3 cannot return a print end event in response to a print job request from a PC 888, a print-ended print job can be deleted from a printer queue in the PC 888. Thus, the user's operability is excellent.

Fourth Embodiment

In the embodiments of the present invention, the color ink-jet printer is used as an example of a printer. However, the present invention is not limited to such specific example. For example, arbitrary printers such as a monochrome LBP can be used.

In the embodiments, the personal computer is assumed as an information processing apparatus. However, the present invention is not limited to this. For example, the present invention can be effectively implemented for arbitrary information processing apparatuses (terminals) such as DVD players, game machines, set-top boxes, Internet home electric appliances, and the like, which allow similar use methods.

In the embodiments of the present invention, the printer has been exemplified as a peripheral apparatus. However, the present invention is also applicable to a copying machine, facsimile apparatus, scanner, digital camera, digital video camera, and apparatus including their multiple functions as a peripheral apparatus in addition to the printer.

In the embodiments of the present invention, as interfaces between the PCs 1, 2, 5, and 888 and the printer 3, for example, arbitrary interfaces such as a wireless LAN, IEEE1394, and Bluetooth® may be used.

In the embodiments of the present invention, the WSD has been exemplified as a Web service protocol. However, the present invention is not limited to such specific example. For example, arbitrary protocols such as IHV native protocols may be used.

In the embodiments of the present invention, an IP address is acquired from a TCP reception socket at an HTTP POST addressed to a WSD print service, a computer name is acquired based on this IP address, and the PC is specified using this computer name. However, the present invention is not limited to this example. For example, the PC may be specified using other methods. That is, an IP address may be acquired from a TCP reception socket at an HTTP POST addressed to a WSD print service, and the PC may be specified using this IP address.

Using the IP address in this way, since the need for a care of handling 2-byte codes in the WSD protocol can be obviated, programs can be simplified and coding errors can be minimized, thus improving the quality.

The embodiments of the present invention have exemplified the case in which the <ans:EventControl> element and <ans:JobEndStateEvent> element are acquired using the GetPrinterElements operation. However, the present invention is not limited to such example. In place of the operation for acquiring information associated with the printer, an operation for acquiring information associated with a print job may be used. Such operation includes those which are defined by the WSD Print Service Definition such as a GetJobElements operation.

The embodiments of the present invention have exemplified the following case. That is, the PC refers to information (INFO:xxx) which represents a printer status included in the Device ID set in the <wprt:DeviceId> element 804 acquired from the printer. Then, the PC determines based on the value set in this information whether or not print processing in the printer is complete, and the printer is online and in a standby state ("000") or the print processing is in progress ("001"). However, the present invention is not limited to such example. For example, the printer status may be acquired using another protocol such as SNMP or commands, and a processing status of a print job request in the printer may be checked based on the acquisition result.

According to the present invention, the following effects can be obtained.

(1) In a case in which an information processing apparatus issues a print job request to a peripheral apparatus, and the peripheral apparatus cannot notify the information processing apparatus of a print end event in association with that print job request, that print job can be deleted from a printer queue in the information processing apparatus. Thus, a processing status of a print job is reflected in real time in the printer queue, thus assuring excellent user's operability.

(2) Since a print-ended print job is automatically deleted from the printer queue in the information processing apparatus, malfunctions of the operating system and erroneous operations of the user can be prevented.

(3) Assuming a case in which the printer cannot notify any event, a time interval required for the OS to periodically issue a GetActiveJobs operation to the printer need not be shortened, thus assuring excellent user's operability.

(4) When the "leave document after printing" function is set in the printer queue, a print-ended print job is not deleted from the printer queue. Hence, this function can also normally operate without being malfunctioned.

(5) Even when the peripheral apparatus can simultaneously accept and process a plurality of print job requests, the information processing apparatus can sequentially issue a plurality of print jobs stacked in the printer queue to the peripheral apparatus without being influenced by print processing statuses of other print job requests. Thus, the user's operability can be improved.

(6) Even when the peripheral apparatus can simultaneously accept and process a plurality of print job requests, a print-ended print job can be automatically deleted from the printer queue in the information processing apparatus, thus assuring excellent user's operability.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-189988, filed Aug. 26, 2010, which is hereby incorporated by reference herein in its entirety.

What is claimed is:

1. A peripheral apparatus control system, configured by an information processing apparatus using a printer queue required to stack print jobs, and a peripheral apparatus, which are connected via a network,
wherein said information processing apparatus comprises:
an issuance unit that issues, to said peripheral apparatus, a request required to acquire a response including information that represents whether or not said peripheral apparatus is configured to notify said information processing apparatus of an event; and
an acquisition unit that acquires and saves the response from said peripheral apparatus, and
said peripheral apparatus comprises:
a return unit that returns a response including information that represents whether or not said peripheral apparatus is configured to notify said information processing apparatus of an event in response to the request issued from said information processing apparatus, and
wherein when the information included in the response returned from said peripheral apparatus after said information processing apparatus has sent data of the print job to said peripheral apparatus is information that represents that said peripheral apparatus is configured not to notify said information processing apparatus of any event, said information processing apparatus deletes the print job from the printer queue.

2. The system according to claim 1, wherein when said information processing apparatus has sent data of the print job to said peripheral apparatus, said issuance unit issues, to said peripheral apparatus, the request required to acquire the response including information that represents whether or not said peripheral apparatus is configured to notify said information processing apparatus of an event.

3. A peripheral apparatus connected to an information processing apparatus via a network, comprising:
a return unit that returns a response including information that represents whether or not said peripheral apparatus is configured to notify the information processing apparatus of an event in response to a request which is issued from the information processing apparatus so as to acquire the response,
wherein when said peripheral apparatus is configured to notify the information processing apparatus of the event, said return unit sets information which represents that said peripheral apparatus is configured to notify the information processing apparatus of the event in the response, and when said peripheral apparatus is configured not to notify the information processing apparatus of any event, said return unit sets information indicating that said peripheral apparatus is configured not to notify the information processing apparatus of any event in the response.

4. An information processing apparatus, which is connected to a peripheral apparatus via a network, and uses a printer queue required to stack print jobs issued to the peripheral apparatus, comprising:
an issuance unit that issues, to the peripheral apparatus, a request required to acquire a response including information that represents whether or not the peripheral apparatus is configured to notify said information processing apparatus of an event; and
an acquisition unit that acquires and saves the response from the peripheral apparatus,
wherein when the information included in the response acquired from the peripheral apparatus after data of the print job have been sent to the peripheral apparatus is information which represents that the peripheral apparatus is configured not to notify said information processing apparatus of any event, said information processing apparatus deletes the print job from the printer queue.

5. The apparatus according to claim 4, wherein when data of the print job have been sent to said peripheral apparatus, said issuance unit issues, to the peripheral apparatus, the request required to acquire the response including information that represents whether or not the peripheral apparatus is configured to notify said information processing apparatus of an event.

6. A control method executed in a peripheral apparatus connected to an information processing apparatus via a network, comprising:
returning a response including information that represents whether or not the peripheral apparatus is configured to notify the information processing apparatus of an event in response to a request which is issued from the information processing apparatus so as to acquire the response,
wherein in the returning step, when the peripheral apparatus is configured to notify the information processing apparatus of the event, the information which represents that the peripheral apparatus is configured to notify the information processing apparatus of the event is set in the response, and when the peripheral apparatus is configured not to notify the information processing apparatus of any event, information indicating that the peripheral apparatus is configured not to notify the information processing apparatus of any event is set in the response.

7. A control method executed in an information processing apparatus, which is connected to a peripheral apparatus via a network, and uses a printer queue required to stack print jobs issued to the peripheral apparatus, comprising:

issuing, to the peripheral apparatus, a request required to acquire a response including information that represents whether or not the peripheral apparatus is configured to notify the information processing apparatus of an event; and acquiring and saving the response from the peripheral apparatus, wherein when the information included in the response acquired from the peripheral apparatus after data of the print job have been sent to the peripheral apparatus is information which represents that the peripheral apparatus is configured not to notify the information processing apparatus of any event, the print job is deleted from the printer queue.

8. A non-transitory computer-readable recording medium recording a program for controlling a computer to execute a control method of claim 6.

9. A non-transitory computer-readable recording medium recording a program for controlling a computer to execute a control method of claim 7.

10. The system according to claim 1, wherein the information, that represents whether or not the peripheral apparatus is configured to notify the information processing apparatus of the event, is the information that represents whether or not the peripheral apparatus is able to notify the information processing apparatus of the event, and wherein the information, that represents that the peripheral apparatus is configured not to notify the information processing apparatus of the event, is the information that represents that the peripheral apparatus is not able to notify the information processing apparatus of the event.

11. The system according to claim 10, wherein the return unit returns, when a number of information processing apparatuses, which the peripheral apparatus can notify of the event, exceeds a predetermined number, the response including information that represents that the peripheral apparatus is not able to notify an information processing apparatus, which the peripheral apparatus is not able to notify of the event, of the event in response to the request.

12. The peripheral apparatus according to claim 3, wherein the information, that represents whether or not the peripheral apparatus is configured to notify the information processing apparatus of the event, is the information that represents whether or not the peripheral apparatus is able to notify the information processing apparatus of the event, and wherein when the peripheral apparatus is able to notify the information processing apparatus of the event, the return unit sets information which represents that the peripheral apparatus is able to notify the information processing apparatus of the event in the response, and when the peripheral apparatus is not able to notify the information processing apparatus of the event, the return unit sets information indicating that the peripheral apparatus is not able to notify the information processing apparatus of the event in the response.

13. The peripheral apparatus according to claim 12, wherein the return unit returns, when a number of information processing apparatuses, which the peripheral apparatus can notify of the event, exceeds a predetermined number, the response including information that represents that the peripheral apparatus is not able to notify an information processing apparatus, which the peripheral apparatus is not able to notify of the event, of the event in response to the request.

14. The information processing apparatus according to claim 4, wherein the information, that represents whether or not the peripheral apparatus is configured to notify the information processing apparatus of the event, is the information that represents whether or not the peripheral apparatus is able to notify the information processing apparatus of the event, and wherein the information, that represents that the peripheral apparatus is configured not to notify the information processing apparatus of the event, is the information that represents that the peripheral apparatus is not able to notify the information processing apparatus of the event.

15. The control method according to claim 6, wherein the information, that represents whether or not the peripheral apparatus is configured to notify the information processing apparatus of the event, is the information that represents whether or not the peripheral apparatus is able to notify the information processing apparatus of the event, and wherein when the peripheral apparatus is able to notify the information processing apparatus of the event, the returning step sets information which represents that the peripheral apparatus is able to notify the information processing apparatus of the event in the response, and when the peripheral apparatus is not able to notify the information processing apparatus of the event, the returning step sets information indicating that the peripheral apparatus is not able to notify the information processing apparatus of the event in the response.

16. The control method according to claim 15, wherein the return step returns, when a number of information processing apparatuses, which the peripheral apparatus can notify of the event, exceeds a predetermined number, the response including information that represents that the peripheral apparatus is not able to notify an information processing apparatus, which the peripheral apparatus is not able to notify of the event, of the event in response to the request.

17. The control method according to claim 7, wherein the information, that represents whether or not the peripheral apparatus is configured to notify the information processing apparatus of the event, is the information that represents whether or not the peripheral apparatus is able to notify the information processing apparatus of the event, and wherein the information, that represents that the peripheral apparatus is configured not to notify the information processing apparatus of the event, is the information that represents that the peripheral apparatus is not able to notify the information processing apparatus of the event.

* * * * *